US009411413B2

(12) United States Patent
Motta et al.

(10) Patent No.: US 9,411,413 B2
(45) Date of Patent: *Aug. 9, 2016

(54) THREE DIMENSIONAL USER INTERFACE EFFECTS ON A DISPLAY

(71) Applicant: Apple Inc., Cupertino, CA (US)

(72) Inventors: Ricardo Motta, Palo Alto, CA (US); Mark Zimmer, Aptos, CA (US); Geoff Stahl, San Jose, CA (US); David Hayward, Los Altos, CA (US); Frank Doepke, San Jose, CA (US)

(73) Assignee: Apple Inc., Cupertino, CA (US)

( * ) Notice: Subject to any disclaimer, the term of this patent is extended or adjusted under 35 U.S.C. 154(b) by 206 days.

This patent is subject to a terminal disclaimer.

(21) Appl. No.: 14/329,777

(22) Filed: Jul. 11, 2014

(65) Prior Publication Data

US 2015/0009130 A1 Jan. 8, 2015

Related U.S. Application Data

(63) Continuation-in-part of application No. 12/849,945, filed on Aug. 4, 2010, now Pat. No. 8,913,056.

(60) Provisional application No. 62/013,439, filed on Jun. 17, 2014.

(51) Int. Cl.
G06T 15/00 (2011.01)
G06F 3/01 (2006.01)
(Continued)

(52) U.S. Cl.
CPC .............. *G06F 3/012* (2013.01); *G06F 3/005* (2013.01); *G06F 3/0346* (2013.01); *G06F 3/04815* (2013.01); *G06T 15/20* (2013.01); *G06F 2203/0381* (2013.01)

(58) Field of Classification Search
None
See application file for complete search history.

(56) References Cited

U.S. PATENT DOCUMENTS 7,535,486 B2  5/2009  Motomura
8,094,091 B2  1/2012  Noma
(Continued)

FOREIGN PATENT DOCUMENTS

JP  2004246920 A  9/2004
JP  2004309947 A  11/2004
(Continued)

OTHER PUBLICATIONS

Adobe Encore CS4 User Guide, Adobe, Dec. 12, 2008, pp. 75, 76, URL: http://help.adobe/com/archive/ja_JP/encore/cs4/encore_cs4_help.pdf.
(Continued)

*Primary Examiner* — Xiao Wu
*Assistant Examiner* — Mohammad H Akhavannik
(74) *Attorney, Agent, or Firm* — Blank Rome LLP

(57) ABSTRACT

The techniques disclosed herein may use various sensors to infer a frame of reference for a hand-held device. In fact, with various inertial clues from accelerometer, gyrometer, and other instruments that report their states in real time, it is possible to track a Frenet frame of the device in real time to provide an instantaneous (or continuous) 3D frame-of-reference. In addition to—or in place of—calculating this instantaneous (or continuous) frame of reference, the position of a user's head may either be inferred or calculated directly by using one or more of a device's optical sensors, e.g., an optical camera, infrared camera, laser, etc. With knowledge of the 3D frame-of-reference for the display and/or knowledge of the position of the user's head, more realistic virtual 3D depictions of the graphical objects on the device's display may be created—and interacted with—by the user.

20 Claims, 15 Drawing Sheets

(51) Int. Cl.
*G06T 15/20* (2011.01)
*G06F 3/00* (2006.01)
*G06F 3/0481* (2013.01)
*G06F 3/0346* (2013.01)

(56) References Cited

U.S. PATENT DOCUMENTS

| | | | |
|---|---|---|---|
| 8,423,076 | B2 | 4/2013 | Kim |
| 2006/0092133 | A1 | 5/2006 | Touma |
| 2006/0164382 | A1 | 7/2006 | Kulas |
| 2008/0307360 | A1 | 12/2008 | Chaudhri |
| 2009/0179914 | A1 | 7/2009 | Dahlke |
| 2009/0201246 | A1 | 8/2009 | Lee |
| 2009/0251460 | A1 | 10/2009 | Dunnigan |
| 2009/0262074 | A1 | 10/2009 | Nasiri |
| 2009/0303231 | A1 | 12/2009 | Robinet |
| 2009/0313584 | A1 | 12/2009 | Kerr |
| 2010/0064259 | A1 | 3/2010 | Alexanderovitc |
| 2010/0115471 | A1 | 5/2010 | Louch |
| 2010/0188358 | A1 | 7/2010 | Kocienda |
| 2011/0254865 | A1 | 10/2011 | Yee |
| 2013/0069883 | A1 | 3/2013 | Oga |
| 2013/0217441 | A1 | 8/2013 | Kitatani |

FOREIGN PATENT DOCUMENTS

| | | | |
|---|---|---|---|
| JP | 2006126445 | A | 5/2006 |
| JP | 2007080060 | A | 3/2007 |
| JP | 2007121489 | A | 5/2007 |
| JP | 2009294728 | A | 12/2009 |
| JP | 2011128220 | A | 6/2011 |
| JP | 2011203984 | A | 10/2011 |
| JP | 2013537670 | A | 10/2013 |
| TW | 487871 | B | 5/2002 |
| TW | 200301444 | A | 7/2003 |
| TW | 200537395 | A | 11/2005 |
| TW | 200713122 | A | 4/2007 |
| TW | 200919294 | A | 5/2009 |
| WO | 2005119591 | A | 12/2005 |
| WO | 2011145304 | A1 | 11/2011 |
| WO | 2012060039 | A1 | 5/2012 |

OTHER PUBLICATIONS

Noriko Takiguchi, Business Model Innovators, DIAMONDonline, Diamond, Inc, May 7, 2010, URL: http://diamond.jp/articles/print/8054.

Bloomenthal, Jules, "Calculation of Reference Frames along a Space Curve," Graphics Gems, vol. 1, pp. 1-5 (1990).

Bouchaud, Jeremie, "3-axis Gyroscope, the new killer product for cell phones," printed Sep. 12, 2011 from http://memsblog.wordpress.com.

Colin Ware and Kathy Lowther, "Selection Using a One-Eyed Cursor in a Fish Tank VR Environment," Dec. 1997, ACM, ACM Transactions on Computer-Human Interaction, vol. 4, Issue 4, pp. 309-322.

Hannuksel, Jari, et al., "Face Tracking for Spatially Aware Mobile User Interfaces," Jul. 1, 2008, Machine Vision Group, Infotech Oulu, 8 pages.

THREE DIMENSIONAL USER INTERFACE EFFECTS ON A DISPLAY

BACKGROUND

It's no secret that video games now use various properties of motion and position collected from, e.g., compasses, accelerometers, gyrometers, and Global Positioning System (GPS) units in hand-held devices or control instruments to improve the experience of play in simulated, i.e., virtual, three dimensional (3D) environments. In fact, software to extract so-called "six axis" positional information from such control instruments is well-understood, and is used in many video games today. The first three of the six axes describe the "yaw-pitch-roll" of the device in three dimensional space. In mathematics, the tangent, normal, and binormal unit vectors for a particle moving along a continuous, differentiable curve in three dimensional space are often called T, N, and B vectors, or, collectively, the "Frenet frame," and are defined as follows: T is the unit vector tangent to the curve, pointing in the direction of motion; N is the derivative of T with respect to the arclength parameter of the curve, divided by its length; and B is the cross product of T and N. The "yaw-pitch-roll" of the device may also be represented as the angular deltas between successive Frenet frames of a device as it moves through space. The other three axes of the six axes describe the "X-Y-Z" position of the device in relative three dimensional space, which may also be used in further simulating interaction with a virtual 3D environment.

Face detection software is also well-understood in the art and is applied in many practical applications today including: digital photography, digital videography, video gaming, biometrics, surveillance, and even energy conservation. Popular face detection algorithms include the Viola-Jones object detection framework and the Schneiderman & Kanade method. Face detection software may be used in conjunction with a device having a front-facing camera (or other optical sensor(s)) to determine when there is a human user present in front of the device, as well as to track the movement of such a user in front of the device.

However, current systems do not take into account the location and position of the device on which the virtual 3D environment is being rendered in addition to the location and position of the user of the device, as well as the physical and lighting properties of the user's environment in order to render a more interesting and visually pleasing interactive virtual 3D environment on the device's display.

Thus, there is need for techniques for tracking the movement of an electronic device having a display, as well as the lighting conditions in the environment of a user of such an electronic device and the movement of the user of such an electronic device—and especially the position of the user of the device's eyes and/or head. With information regarding lighting conditions in the user's environment, the position of the user's eyes and/or head, and an instantaneous (or continuous) 3D frame-of-reference for the display of the electronic device, virtual 3D depictions of the objects on the device's display may be created that are more appropriately drawn for the user's current point of view with respect to the device's display.

SUMMARY

The techniques disclosed herein use various position sensors, e.g., a compass, a Micro-Electro-Mechanical Systems (MEMS) accelerometer, a GPS module, and a MEMS gyrometer, to infer a 3D frame of reference (which may be a non-inertial frame of reference) for a personal electronic device, e.g., a hand-held device such as a mobile phone. Use of these position sensors can provide a true Frenet frame for the device, i.e., X- and Y-vectors for the display, and also a Z-vector that points perpendicularly to the display. In fact, with various inertial clues from an accelerometer, gyrometer, and other instruments that report their states in real time, it is possible to track the Frenet frame of the device in real time, thus providing an instantaneous (or continuous) 3D frame of reference for the hand-held device. Once an instantaneous (or continuous) frame of reference of the device is known, the techniques that will be disclosed herein can then either infer the position of the user's eyes and/or head, or calculate the position of the user's eyes and/or head directly by using a front-facing camera or other optical sensor(s). With an instantaneous (or continuous) 3D frame-of-reference for the display and/or the position of the user's eyes and/or head, more realistic virtual 3D depictions of graphical objects on the device's display may be created and interacted with.

To accomplish a more realistic virtual 3D depiction of the objects on the device's display, objects may be rendered on the display as if they were in a real 3D "place" in the device's operating system environment. In some embodiments, the positions of objects on the display can be calculated by ray tracing their virtual coordinates, i.e., their coordinates in the virtual 3D world of objects, back to the user of the device's eyes and/or head and intersecting the coordinates of the objects with the real plane of the device's display. In other embodiments, virtual 3D user interface (UI) effects, referred to herein as "2½D" effects, may be applied to 2D objects on the device's display in response to the movement of the device, the movement of the user (e.g., the user's head), or the lighting conditions in the user's environment in order to cause the 2D objects to "appear" to be virtually three dimensional to the user.

3D UI Effects Achievable Using This Technique

It is possible, for instance, using a 2½D depiction of a user interface environment to place realistic moving shines or moving shadows on the graphical user interface objects, e.g., icons, displayed on the device in response to the movement of the device, the movement of the user, or the lighting conditions in the user's environment.

It is also possible to create a "virtual 3D operating system environment" and allow the user of a device to "look around" a graphical user interface object located in the virtual 3D operating system environment in order to see its "sides." If the frame of reference is magnified to allow the user to focus on a particular graphical user interface object, it is also possible for the user to rotate the object to "see behind" it as well, via particular positional changes of the device or the user, as well as user interaction with the device's display.

It is also possible to render the virtual 3D operating system environment as having a recessed "bento box" form factor inside the display. Such a form factor would be advantageous for modular interfaces. As the user rotated the device, he or she could look into each "cubby hole" of the bento box independently. It would also then be possible, via the use of a front-facing camera or other optical sensor(s), to have visual "spotlight" effects follow the user's gaze, i.e., by having the spotlight effect "shine" on the place in the display that the user is currently looking into. It is also possible to control a position of a spotlight effect based solely on a determined 3D frame of reference for the device. For example, the spotlight effect could be configured to shine into the cubby hole whose distorted normal vector pointed the closest in direction to the user of the device's current position.

Interaction with a Virtual 3D World Inside the Display

To interact via touch with the virtual 3D display, the techniques disclosed herein make it possible to ray trace the location of the touch point on the device's display into the virtual 3D operating system environment and intersect the region of the touch point with whatever object or objects it hits. Motion of the objects caused by touch interaction with the virtual 3D operating system environment could occur similarly to how it would in a 2D mode, but the techniques disclosed herein would make it possible to simulate collision effects and other physical manifestations of reality within the virtual 3D operating system environment. Further, it is possible to better account for issues such touchscreen parallax, i.e., the misregistration between the touch point and the intended touch location being displayed, when the Frenet frame of the device is known.

How to Prevent the GPU from Constantly Re-Rendering

To prevent the over-use of the Graphics Processing Unit (GPU) and excessive battery drain on the device, the techniques disclosed herein employ the use of a particularized gesture to turn on the "virtual 3D operating system environment" mode, as well as positional quiescence to turn the mode off. In one embodiment, the gesture is the so-called "princess wave," i.e., the wave-motion rotation of the device about one of its axes. For example, the "virtual 3D operating system environment" mode can be turned on when more than three waves of 10-20 degrees along one axis occur within the span of one second.

In one embodiment, when the "virtual 3D operating system environment" mode turns on, the display of the UI "unfreezes" and turns into a 3D depiction of the operating system environment (preferably similar to the 2D depiction, along with shading and textures indicative of 3D object appearance). When the mode is turned off, the display could slowly transition back to a standard orientation and freeze back into the 2D or 2½D depiction of the user interface environment. Positional quiescence, e.g., holding the device relatively still for two to three seconds, could be one potential cue to the device to freeze back to the 2D or 2½D operating system environment mode and restore the display of objects to their more traditional 2D representations.

Desktop Machines As Well

On desktop machines, the Frenet frame of the device doesn't change, and the position of the user with respect to the device's display would likely change very little, but the position of the user's eyes and/or head could change significantly. A front-facing camera or other optical sensor(s), in conjunction with face detection software, would allow the position of the user's eyes and/or head to be computed. Using field-of-view information for the camera, it would also be possible to estimate the distance of the user's head from the display, e.g., by measuring the head's size or by measuring the detected user's pupil-to-pupil distance and assuming a canonical measurement for the human head, according to ergonomic guidelines. Using this data, it would then be possible to depict a realistic 2½D or 3D operating system environment mode, e.g., through putting shines on windows, title bars, and other UI objects, as well as having them move in response to the motion of the user's eyes or the changing position of the user's head. Further, it would also be possible to use the position of the user's head and eyes to allow the user to "look under" a window after the user shifts his or her head to the side and/or moves his or her head towards the display.

Because of innovations presented by the embodiments disclosed herein, the 3D UI effects utilizing properties of motion that are described below may be implemented directly by a personal electronic device's hardware and/or software, making the techniques readily applicable to any number of personal electronic devices, such as mobile phones, personal data assistants (PDAs), portable music players, televisions, gaming consoles, portable gaming devices, as well as laptop, desktop, and tablet computers.

DETAILED DESCRIPTION

Figure 1:
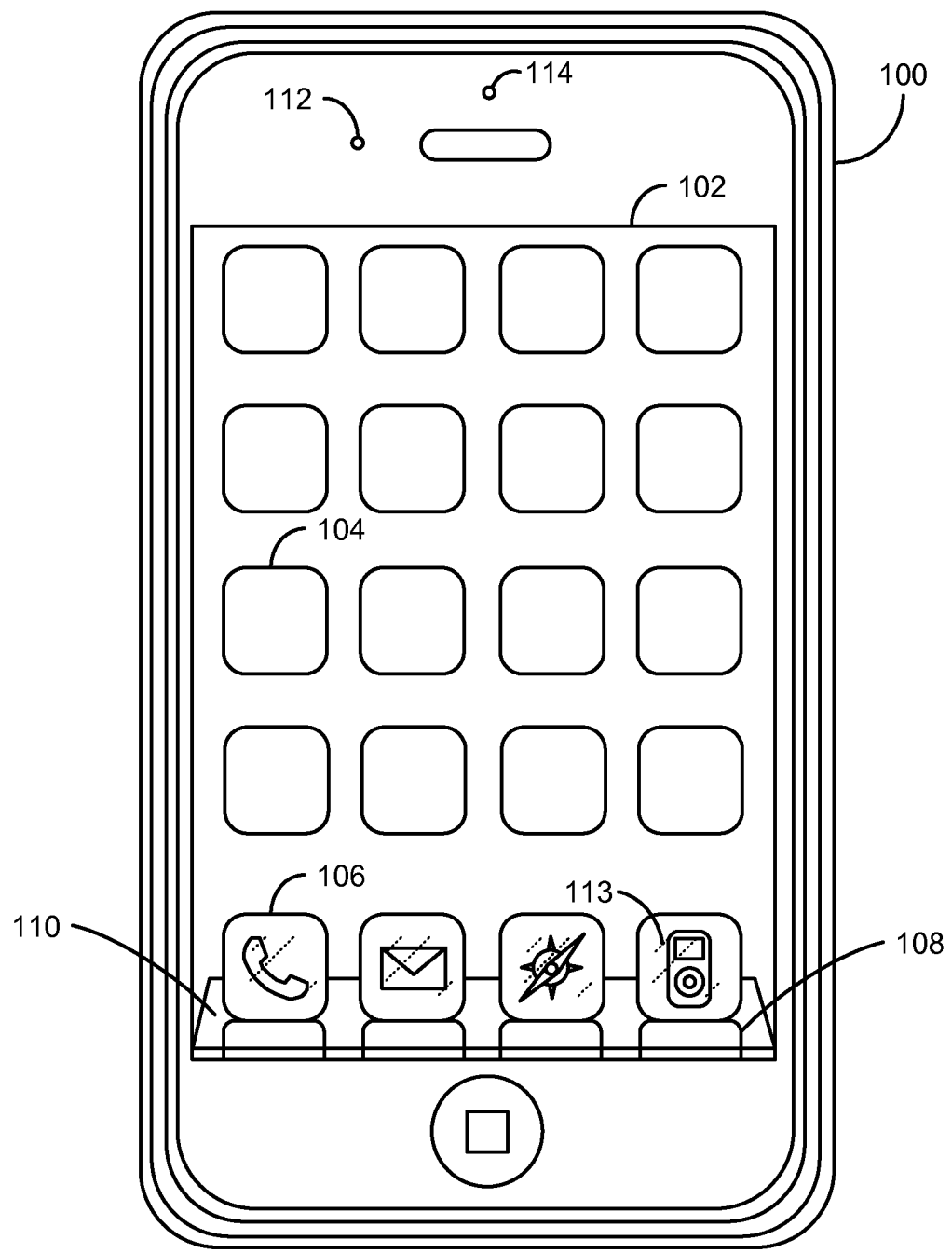
FIG. 1 illustrates an exemplary personal electronic device.

This disclosure pertains to techniques for tracking the movement of an electronic device having a display, as well as lighting conditions in the environment of a user of such an electronic device and the movement of the user of such an electronic device—and especially the position of the user of the device's eyes and/or head. With the position of the user's eyes and/or head and an instantaneous (or continuous) 3D frame-of-reference for the display of the electronic device, more realistic virtual 3D depictions of the objects on the device's display (i.e., depictions that are more appropriately drawn for the user's current point of view with respect to the device's display) may be created and interacted with. While this disclosure discusses a new technique for creating more realistic virtual 3D depictions of the objects on a personal electronic device's display, one of ordinary skill in the art would recognize that the techniques disclosed may also be applied to other contexts and applications as well. The techniques disclosed herein are applicable to any number of electronic devices with positional sensors, proximity sensors, and/or optical sensors: such as digital cameras, digital video cameras, mobile phones, personal data assistants (PDAs), portable music players, televisions, gaming consoles, portable gaming devices, desktop, laptop, and tablet computers, and game controllers. An embedded processor, such a Cortex® A8 with the ARM® v7-A architecture, provides a versatile and robust programmable control device that may be utilized for carrying out the disclosed techniques. (CORTEX® and ARM® are registered trademarks of the ARM Limited Company of the United Kingdom.)

In the interest of clarity, not all features of an actual implementation are described in this specification. It will of course be appreciated that in the development of any such actual implementation (as in any development project), numerous decisions must be made to achieve the developers' specific goals (e.g., compliance with system- and business-related constraints), and that these goals will vary from one implementation to another. It will be appreciated that such development effort might be complex and time-consuming, but would nevertheless be a routine undertaking for those of ordinary skill having the benefit of this disclosure. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Referring now to FIG. 1, an exemplary personal electronic device 100 is shown. Personal electronic device 100 in FIG. 1 is depicted as a mobile phone, but this is not the only type of device in which the techniques disclosed herein may be implemented, e.g., the device may also comprise a computer monitor, watch, music player, television screen, dashboard display in a car or other vehicle, etc., wherein it is beneficial to provide 3D effects on a device that are more appropriately drawn for the user's current point of view with respect to the device's display. Device 100 is depicted as having display 102, which may be a capacitive touchscreen interface capable of displaying graphical objects and receiving touch input from a user. Device 100 is also depicted as having one or more optical sensors 112 and a proximity sensor 114, which may comprise, e.g., an infrared sensor. Optical sensor(s) 112 may comprise, e.g., a two-dimensional camera(s), a stereoscopic camera(s), an infrared camera(s), and/or a laser(s). The optical sensors(s) may be used to locate a user of device 100 and estimate a distance of the user to the display 102 of device 100, in addition to the position and direction of gaze of the user's eyes and/or the position of the user's head—as will be explained further below. Proximity sensor 114 may be one of a number of well-known proximity sensors known and used in the art, and it may be used, e.g., to detect the presence of nearby objects without any physical contact. As is known in the art, a proximity sensor often emits an electromagnetic or electrostatic field, or a beam of electromagnetic radiation. Moreover, non-optical means may also be used to obtain equivalent information, such as eyewear or headgear worn by a user, e.g., caps and hats capable of providing position information. Further, external means, such as detectors available in the user's surrounding environment, e.g., detectors in a car dashboard, mounted on computer monitors, installed in room, etc., may also be used to obtain equivalent information. Optical sensor(s) 112 and proximity sensor 114 may also be used to measure light levels in the environment around the user and to locate light sources in the user's environment. As described below, such information may be useful in making a realistic virtual 3D depiction of a graphical user interface that appears to be "responsive" to light sources located in the "real world." Display colors may also be modified according to the measured color of the ambient light in the user's environment. In FIG. 1, display 102 is shown to be displaying several graphical user interface objects, e.g., icon 104. Icon 104 may be indicative of a program, file, or other application that the device is capable of executing should the icon be selected by a user. Also shown on display 102 is an object springboard 110. In the prior art, icons 106 have been depicted as sitting on the surface of springboard 110 to give them the appearance of being in a 3D operating system environment. Additional visual cues may be added to the icons 104/106, such as shines 113 and/or reflections 108 to further enhance the 3D appearance of the icons 104/106. In some embodiments, this enhanced 2D representation may be referred to herein as 2½.

Figure 2:
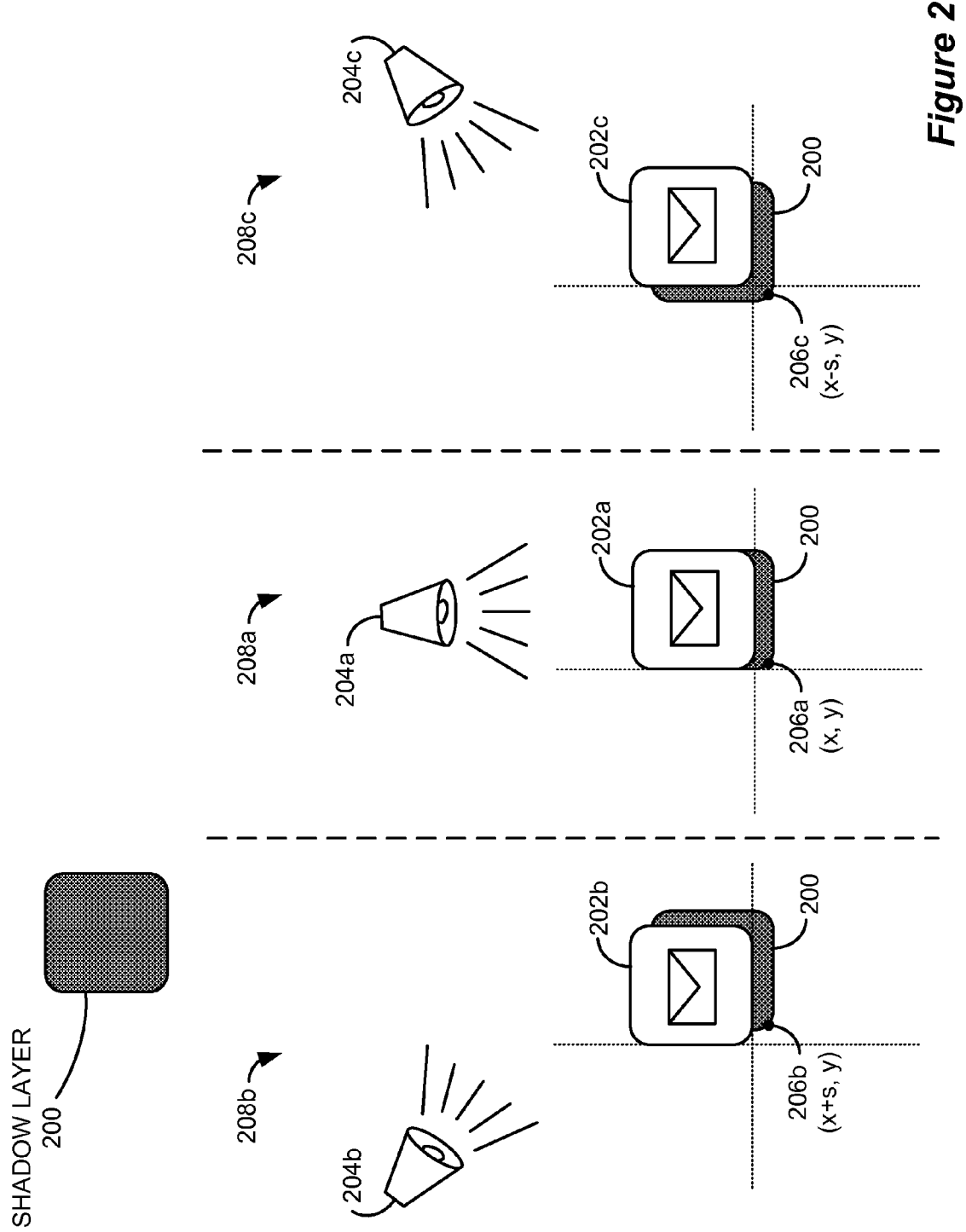
FIG. 2 illustrates an exemplary 3D UI technique that may be employed by a personal electronic device operating in a 2½D operating system environment mode.

Referring now to FIG. 2, an exemplary 3D UI technique that may be employed by a personal electronic device operating in a 2½D operating system environment mode is illustrated, in accordance with one embodiment. In FIG. 2, icon 202 is presented in three different virtual lighting environments, 208*a-c*. In each environment, shadow layer 200 is repositioned appropriately underneath icon 202 to create the illusion that virtual light source 204 is causing a realistic shadow to be cast by icon 202. For example, in virtual lighting environment 208*a*, virtual lighting source 204*a* is positioned directly over icon 202*a*. Thus, shadow layer 200 is placed directly below icon 202*a*, i.e., with no offset. This is indicated by coordinate 206*a*, representing the lower left corner of shadow layer 200 in virtual lighting environment 208*a*. Hypothetical coordinates (x, y) have been assigned to coordinate 206*a* in order to illustrate the repositioning of shadow layer 200 in virtual lighting environments 208*b* and 208*c* as compared to its position in virtual lighting environment 208*a*.

In virtual lighting environment 208*b*, virtual lighting source 204*b* has been positioned above and to the left of icon 202*b*. Thus, shadow layer 200 is placed below icon 202*b* and offset slightly to the right. The amount of offset, s, is determined based on the position and distance between the virtual lighting source and the icon, and creates a realistic lighting effect on icon 202*b*. The offset, s, is indicated by coordinate 206*b*, representing the lower left corner of shadow layer 200 in virtual lighting environment 208*b* and having hypothetical coordinates (x+s, y).

In virtual lighting environment 208*c*, virtual lighting source 204*c* has been positioned above and to the right of icon 202*c*. Thus, shadow layer 200 is placed below icon 202*c* and offset slightly to the left. The amount of offset, s, is determined based on the position and distance between the virtual lighting source and the icon, and creates a realistic lighting effect on icon 202c. The offset, s, is indicated by coordinate 206c, representing the lower left corner of shadow layer 200 in virtual lighting environment 208c and having hypothetical coordinates (x−s, y).

The location of virtual lighting source 204 in a virtual lighting environment used by a personal electronic device employing the techniques disclosed herein may be, e.g., determined programmatically by the device's operating system, selected manually by the user of the device, or positioned by the device's operating system to simulate the location of an ambient light source detected in the user's environment. That is, if a bright light source is located directly above the user of a device, the device's operating system may place the virtual lighting source directly above the virtual lighting environment, so as to accurately simulate the lighting conditions in the user's environment. Further, multiple light sources may be detected and simulated in the virtual lighting environment, and the intensities of such detected light sources may also be accurately simulated.

The 2½D operating system environment techniques, e.g., the one described above in reference to FIG. 2, may be rendered in a relatively computationally cheap and flexible manner by utilizing a suitable graphical programming framework such as Apple Inc.'s CORE ANIMATION® framework. (CORE ANIMATION® is a registered trademark of Apple Inc.) For example, shadow layer 200 is an example of a separate graphical layer that may simply be repositioned at the desired location in the virtual lighting environment to create the illusion that the virtual lighting source has moved. One advantage of the repositioning technique described herein is that the pixels comprising the graphical layer do not need to be re-rendered each time the device's operating system determines that a repositioning of the graphical layer is necessitated due to e.g., the movement of the device or a change in the lighting conditions in the user's environment. Another type of graphical layer, known as a "shine map" may also be implemented as a separate graphical layer and can be repositioned over an icon or other graphical user interface object to create the illusion of different virtual lighting scenarios. Again, one advantage to this technique is that the icon or other graphical user interface object content underneath the shine map does not have to be re-rendered each time the device's operating system determines that a repositioning of the graphical layer is necessitated.

Figure 3:
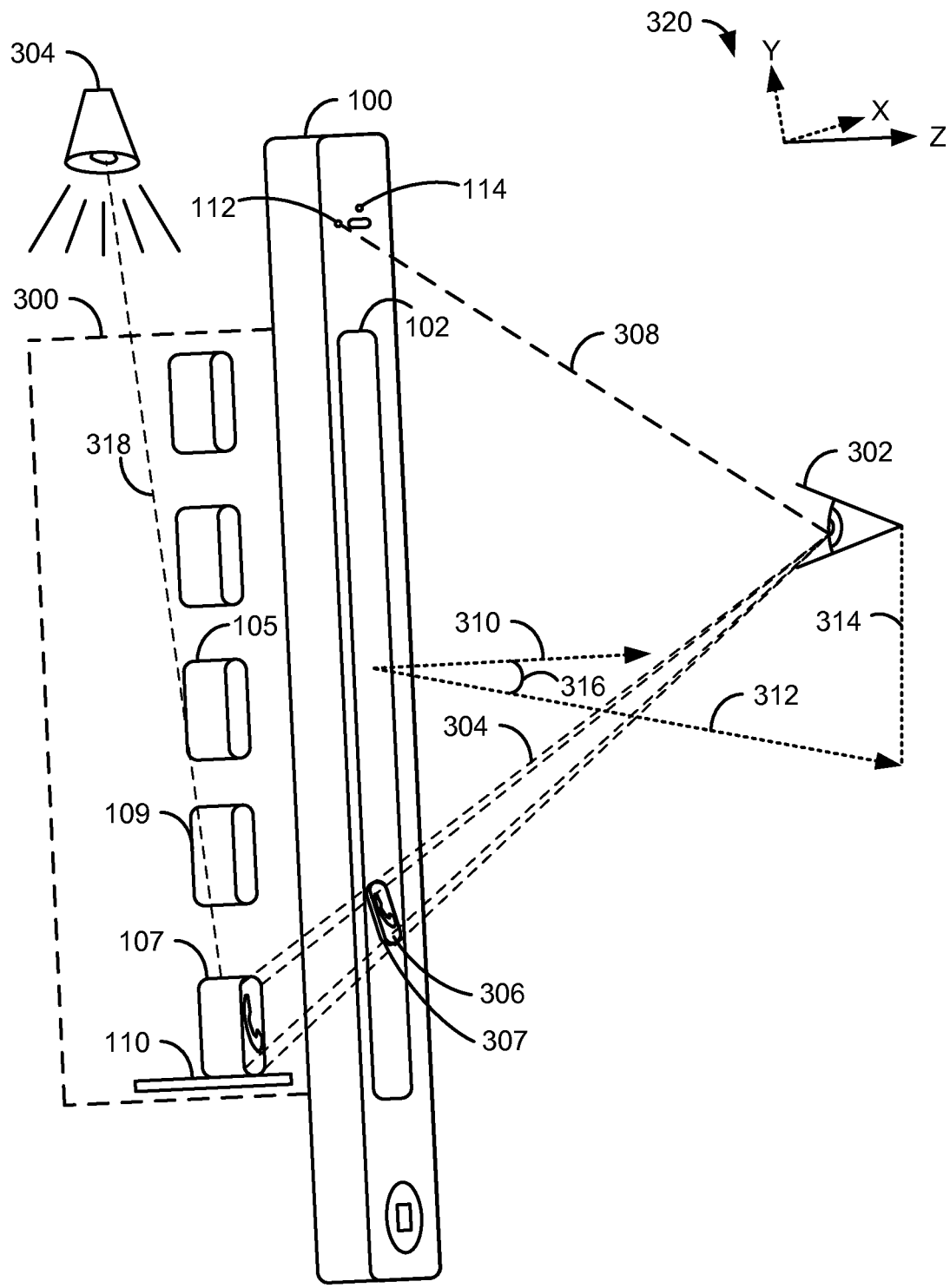
FIG. 3 illustrates a personal electronic device presenting a virtual 3D depiction of a graphical user interface object lit by a virtual light source, in accordance with one embodiment.

Referring now to FIG. 3, a personal electronic device 100 presenting a virtual 3D depiction 306 of a graphical user interface object 106 lit by a simulated, i.e., virtual, light source 304 is illustrated, in accordance with one embodiment. FIG. 3 also shows a side view of virtual 3D operating system environment 300. The two dimensional icons 104/106 depicted in FIG. 1 have been replaced with virtual 3D representations 105/107 of the same icon objects within virtual 3D operating system environment 300. As shown in FIG. 3, icon object is still sitting on springboard 110. As shown by axes 320, in FIG. 3, the X-axis extends along the width of the display 102 and into the page, the Y-axis extends along the length of display 102, and the Z-axis extends perpendicularly away from the surface of display 102. The additional three columns of icons depicted on display 102 in FIG. 1 are not visible as they would extend along the X-axis into the page in the view presented in FIG. 3. It is also to be understood that, in some embodiments, each and every graphical user interface object in the virtual 3D operating system environment 300, including graphics as well as photographs and other images, could be depicted on display 102 of device 100 with appropriate 3D effects. This application focuses only on the representation of a single graphical user interface object, icon 107, for simplicity and clarity.

As is known in the 3D graphics arts, virtual light source 304 may be created by the device's processor(s) and "placed" at various spots in the virtual 3D operating system environment 300 in order to generate realistic shading and shine effects on objects displayed by device display 102. As illustrated in FIG. 3, light source 304 is placed at the top and center of virtual 3D operating system environment 300, although such placement is not strictly necessary. Dashed line 318 indicates the path from virtual graphical user interface object 107 to light source 304. Utilizing the path of dashed line 318 will become important later when certain aspects of ray tracing are discussed in conjunction with rendering a realistic 3D depiction of user interface objects on device display 102.

The eyes (and, by extension, the head) of the user of device 100 are represented by element 302 in FIG. 3. Dashed line 308 indicates the path from the user's eyes (and/or head) to the optical sensor 112 of device 100. As mentioned above, optical sensor 112 may be used to: estimate the length of dashed line 318 (that is, the distance of the user's eyes and/or head to the device); detect (and potentially recognize) the face of the user; measure the current distance between the user's pupils; or to locate light sources in the user's environment. Additionally, proximity sensor 114 may be used to further gauge ambient light levels in the user's environment. Further, light sources in the user's environment may also be detected by measuring specular reflections off the pupils of the user's eyes.

Vector 310 represents a binormal vector that points perpendicularly out from the display 102. Vector 312 represents a vector extending from the display 102 directly to the position of the center of user's eyes and/or head 302 along the X-axis. Dashed line 314 is depicted to help illustrate the position of user's eyes and/or head 302 in the direction of the X-axis with respect to the display 102. The angle 316 between vector 310 and vector 312 can be used by device 100 to determine the angle at which the user is likely viewing display 102. As illustrated in FIG. 3, the user appears to be slightly to the left of the binormal vector 310, i.e., slightly closer to the "surface" of the page rather than deeper "into" the page. The current position of the user in FIG. 3 is also reflected in the depiction of graphical user interface object 306 as having a small amount of its left side 307 visible on the device's display 102 for the user's current orientation and position shown in FIG. 3. As the user's eyes and/or head 302 move farther and farther to the left with respect to the display 102 of device 100, i.e., as angle 316 increases, the user will be able to see more and more of the left side 307 of graphical user interface object 306. One way of understanding the 3D effect resulting from the application of such techniques is to envision the display screen 102 of the hand-held device 100 as a "window" into 3D space 300. As with windows in the real word, as an observer gets closer to or farther from the window, or looks through the window at different angles, the observer is able to see different objects, different angles of objects, etc. To achieve these effects, a technique known as ray tracing may be utilized.

Ray tracing, as known in the art, involves simulating the path a photon would take moving from a light source, to an object an observer is viewing, and then reflected to the observer's eye—only in reverse order. Thus, this process is also sometimes referred to as "backward ray tracing." In one embodiment of a ray tracing process, for each pixel in display 102, a ray 304 is extended from the observer's eye, through the given pixel, and into the virtual 3D operating system environment 300. Whatever virtual 3D object is "pierced" by the projection of the ray into the virtual 3D environment is then displayed in the corresponding pixel in display 102. This process results in the creation of a view on the display screen that is the same view an observer would get if he or she was looking through a window into the virtual 3D environment.

A further step may be implemented once a virtual 3D object has been "pierced" by the projection of the ray into the virtual 3D environment. Specifically, a second ray 318 may be extended from the virtual 3D object to the position of the virtual lighting source 304. If another object is pierced by the second ray 318 as it is extended to the light source 304, it is a cue to the graphics rendering engine to place a shadow on that pixel. In the case of FIG. 3, it appears that ray 318 intersects icon objects 105 and 109, indicating that icon object 107 would have a shadow cast upon its top surface if the user were to adjust his or her own position (or the position of the device) such that he or she could see the top surface of icon object 107. If no object is detected between the pixel being rendered and the light source, then the relative distance to and intensity of the light source may be used to calculate the brightness intensity of the given pixel as it is displayed on device display 102. Utilizing these techniques can produce virtual 3D renderings of environments that accurately portray the effects that lighting would have on the virtual 3D objects if they were actually in a real world setting.

The techniques described above in relation to FIG. 3 allow the GPU of the device to apply appropriate lighting and perspective transformations to the virtual 3D depiction of at least one graphical user interface object on the display of the device, thus resulting in a more realistic and immersive virtual 3D experience for the user of the device. According to some embodiments, the above-described lighting and perspective transformations used to produce the virtual 3D renderings on the display may be turned off if more than one user is detected within viewing proximity of the device.

Figure 4:
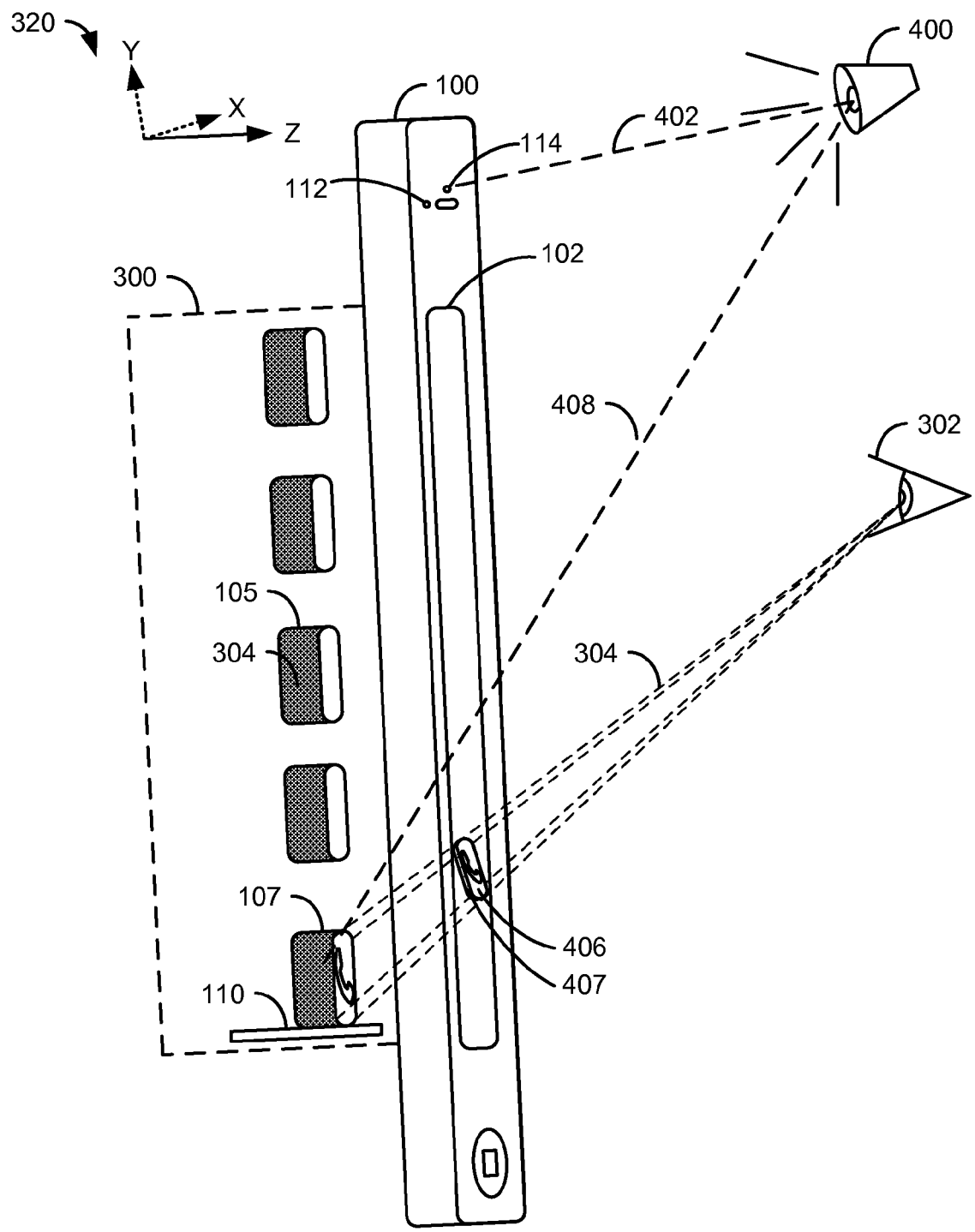
FIG. 4 illustrates a personal electronic device presenting a virtual 3D depiction of a graphical user interface object lit by a representative ambient light source, in accordance with one embodiment.

Referring now to FIG. 4, a personal electronic device 100 presenting a virtual 3D depiction 406 of a graphical user interface object 107 lit by a representative ambient light source 400 is illustrated, in accordance with one embodiment. As in the embodiment described above with respect to FIG. 3, ray tracing techniques may be employed by the GPU of device 100 in order to present a realistic virtual 3D depiction of virtual 3D operating system environment 300. In FIG. 4, however, the lighting source for the virtual 3D operating system environment 300 is not a virtual light source created arbitrarily by the operating system of the device; rather, the virtual 3D operating system environment 300 is depicted as though it were being lit by real world ambient light source 400. Thus, the ray traced back from the virtual 3D operating system environment to ambient light source 400 for object 107 is represented by dashed line 408. Device 100's optical sensor(s) 112 or proximity sensor 114 may be utilized to determine the distance to (represented by dashed line 402)—and relative position of—the brightest real world ambient light source 400, as well as the intensity of real world ambient light source 400. Once this information has been ascertained, the GPU may light the objects in virtual 3D operating system environment 300 according to well-known lighting and shading techniques in the 3D graphics arts.

As shown in FIG. 4, ambient light source 400 is slightly to the right of the device's display 102, i.e., slightly farther "into" the page along the X-axis. The current position of the ambient light source 400 in FIG. 3 is also reflected in the depiction of graphical user interface object 406 as having a small amount of shading 407 on its left side visible on the device's display 102 for the ambient light source 400's current orientation and position as shown in FIG. 4. As the ambient light source 400 moves farther and farther to the right with respect to the display 102 of device 100, i.e., as the ambient light source 400 moves deeper and deeper into the page along the X-axis, there would be more and more shading 404 created on the left sides of the graphical user interface objects 105/107 in the virtual 3D operating system environment 300. Of course, such changes in shading on graphical user interface objects in the virtual 3D operating system environment would likewise be reflected in the rendering of the objects on the device's display 102 should the device 100 and/or user be positioned and oriented such that a shaded side of a graphical user interface object is visible from the vantage point of the user's eyes 302.

In addition to using these techniques, the operating system software of the device can determine some light source positions in the user's environment by analyzing the front-facing camera's (or other optical sensor(s)) view. Specifically, the device may attempt to locate the brightest areas in the front-facing camera's (or other optical sensor(s)) view. To avoid falsely identifying specular reflections (e.g., reflections of a pair of eyeglasses) as light sources, the image received from the front-facing camera (or other optical sensor(s)) may be blurred using a small radius, such as with a Gaussian blur at a standard deviation of 3.0, thus reducing the salience of small specular reflections. In one embodiment, the brightest 5% of the image, if brighter than a predetermined brightness value, may be recognized as a light source and located by thresholding the image, a technique which is known in the image processing art. Once thresholded, the shape i.e., the alpha mask, as well as the centroid of the light source may be computed. The computed centroid may be used to determine the light source's bearing direction in real-world 3D space. Further, a luminance-thresholded version of the front-facing camera's (or other optical sensor(s)) image may be used to put realistic reflections on the renderings of curved objects in the virtual 3D operating system environment. Additionally, if there are no sufficiently bright ambient lights sources located in the environment of the user, the process may default to using a virtual light source, as in FIG. 3 above.

It is also possible, for usage of a device outdoors, to compute the position of the Sun as a real-world light source in the user's environment. This can be done by using Greenwich Mean Time (GMT), the GPS location of the device, and compass bearings, as well as the Frenet frame of the device in the local geographic coordinate system. The technique for the computation of the Sun's relative position at a known point on the earth is well-known. Once computed, the location of the Sun may be utilized to generate a virtual light source for the virtual 3D operating system environment that is representative of the Sun's current location.

Figure 5:
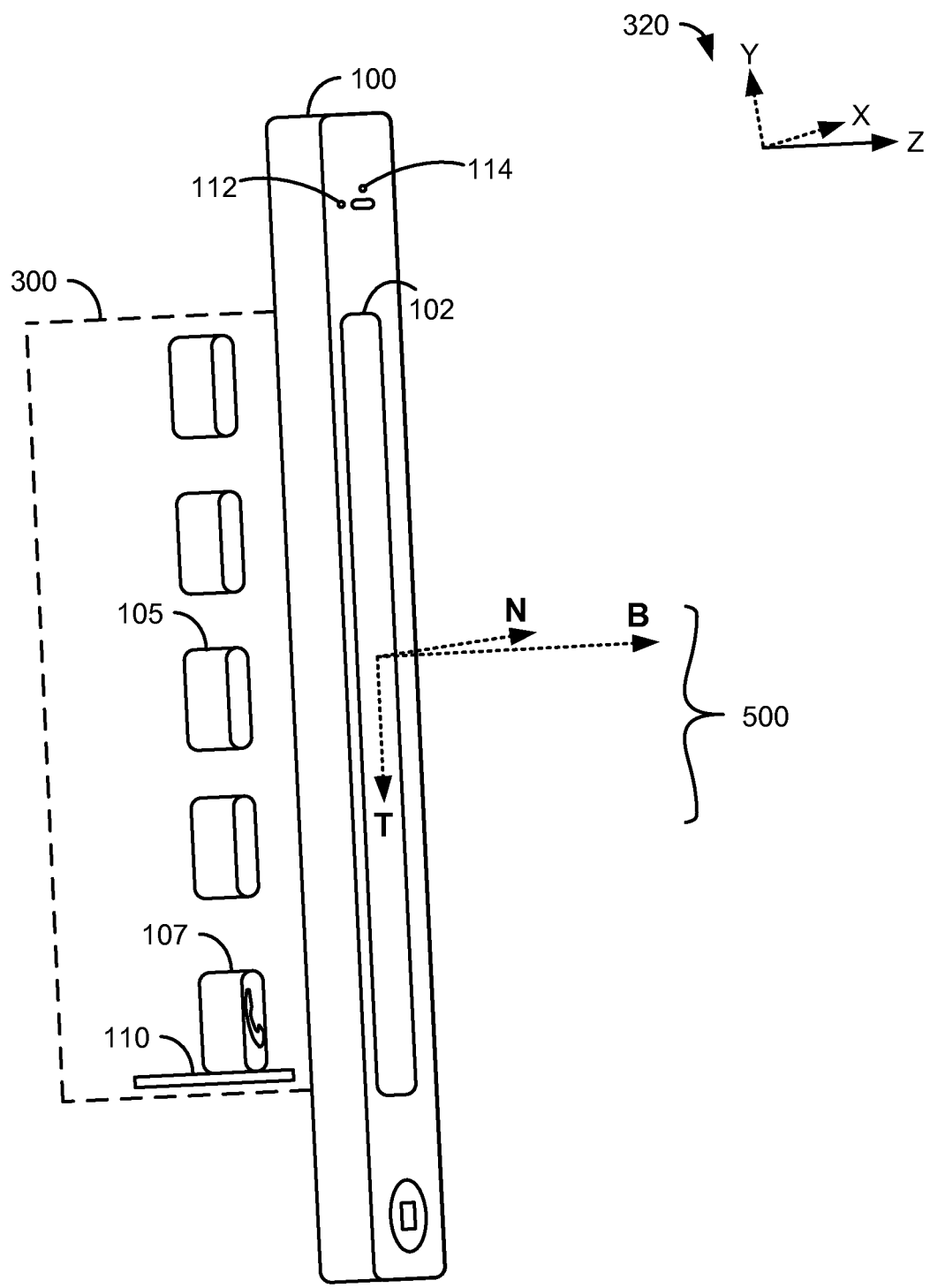
FIG. 5 illustrates the Frenet frame for a personal electronic device, in accordance with one embodiment.

Referring now to FIG. 5, the Frenet frame 500 for a personal electronic device 100 is illustrated, in accordance with one embodiment. As discussed above, in mathematics, a Frenet Frame is defined by the tangent, normal, and binormal unit vectors for a particle moving along a continuous, differentiable curve in three dimensional space, which are often called T, N, and B vectors, as shown in FIG. 5. The T is the unit vector tangent to the curve, pointing in the direction of motion; N is the derivative of T with respect to the arclength parameter of the curve, divided by its length; and B is the cross product of T and N. As shown in FIG. 5, T is aligned with the Y axis of the display, N is aligned with the X axis of the display, and B is normal to the plane of the display. Together, the T, N, and B vectors of the Frenet frame tie the display coordinate system to the coordinate system of the real world.

By utilizing the various positional sensors in device 100, such as a compass, a Micro-Electro-Mechanical Systems (MEMS) accelerometer, a GPS module, and a MEMS gyrometer, a 3D frame of reference may be inferred for the device 100. In fact, it is now possible to track the Frenet frame of the device in real time, thus providing an instantaneous (or continuous) 3D frame of reference for the hand-held device. Once the frame of reference of the device is known, in addition to the position of the user's eyes and/or head, more realistic virtual 3D depictions of the objects on the device's display may be created and interacted with, as is explained further with respect to FIG. 6 below.

Figure 6:
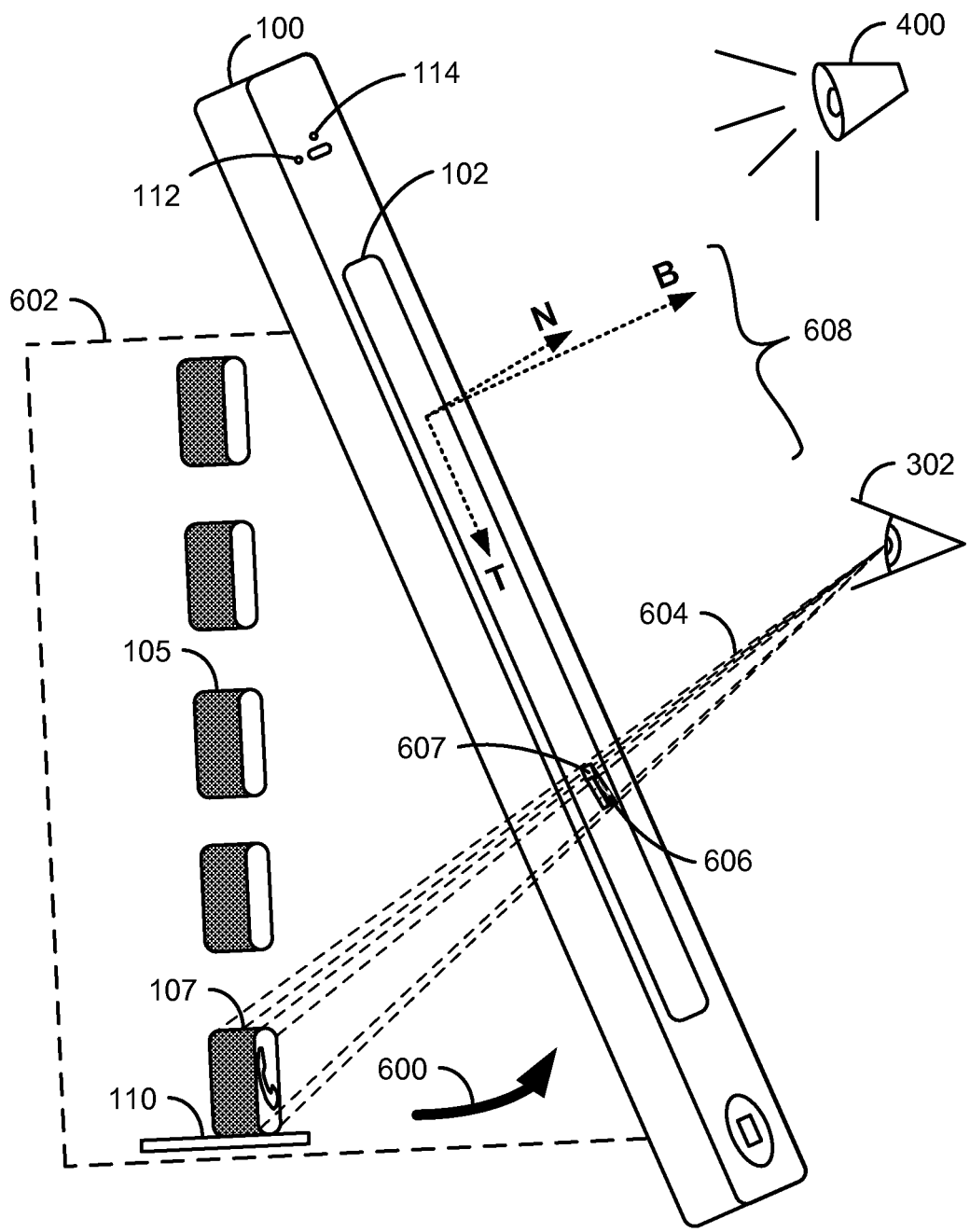
FIG. 6 illustrates the effects of device movement on a personal electronic device presenting a virtual 3D depiction of a graphical user interface object, in accordance with one embodiment.

Referring now to FIG. 6, the effects of device movement 600 on a personal electronic device 100 presenting a virtual 3D depiction 606 of a graphical user interface object 107 is illustrated, in accordance with one embodiment. Notice that the Frenet frame 608 of the device 100 as oriented in FIG. 6 is substantially different from the Frenet frame 500 of the device 100 as oriented in FIG. 5. Specifically, the device 100 has been tilted such that the eyes 302 of the user look slightly downwards into virtual 3D operating system environment 602. Arrow 600 is indicative of the difference in position of device 100 between FIG. 5 and FIG. 6. As can be seen from the projection ray traces 604 extending from the eyes 302 of the user through the plane of the device display 102 and into the virtual 3D operating system environment 602, the depiction 607 of graphical user interface object 107 shows a small amount of graphical user interface object 107's top surface 607 on the device's display 102. This is in contrast to the depiction 406 of graphical user interface object 107 shown in FIG. 4, wherein the "window" into the virtual 3D operating system environment 300 (i.e., the "window" being the display 102 of device 100) is more parallel with respect to the orientation of the vertical stacks of icon objects in the virtual 3D operating system environment, and, thus, the user is unable to see the top surface of graphical user interface object 107. Applying these techniques, it becomes clear that the user would be able to manipulate the position of the device and/or his or her eyes and/or head in order to see the side surfaces of graphical user interface objects or even behind graphical user interface objects.

Figure 7:
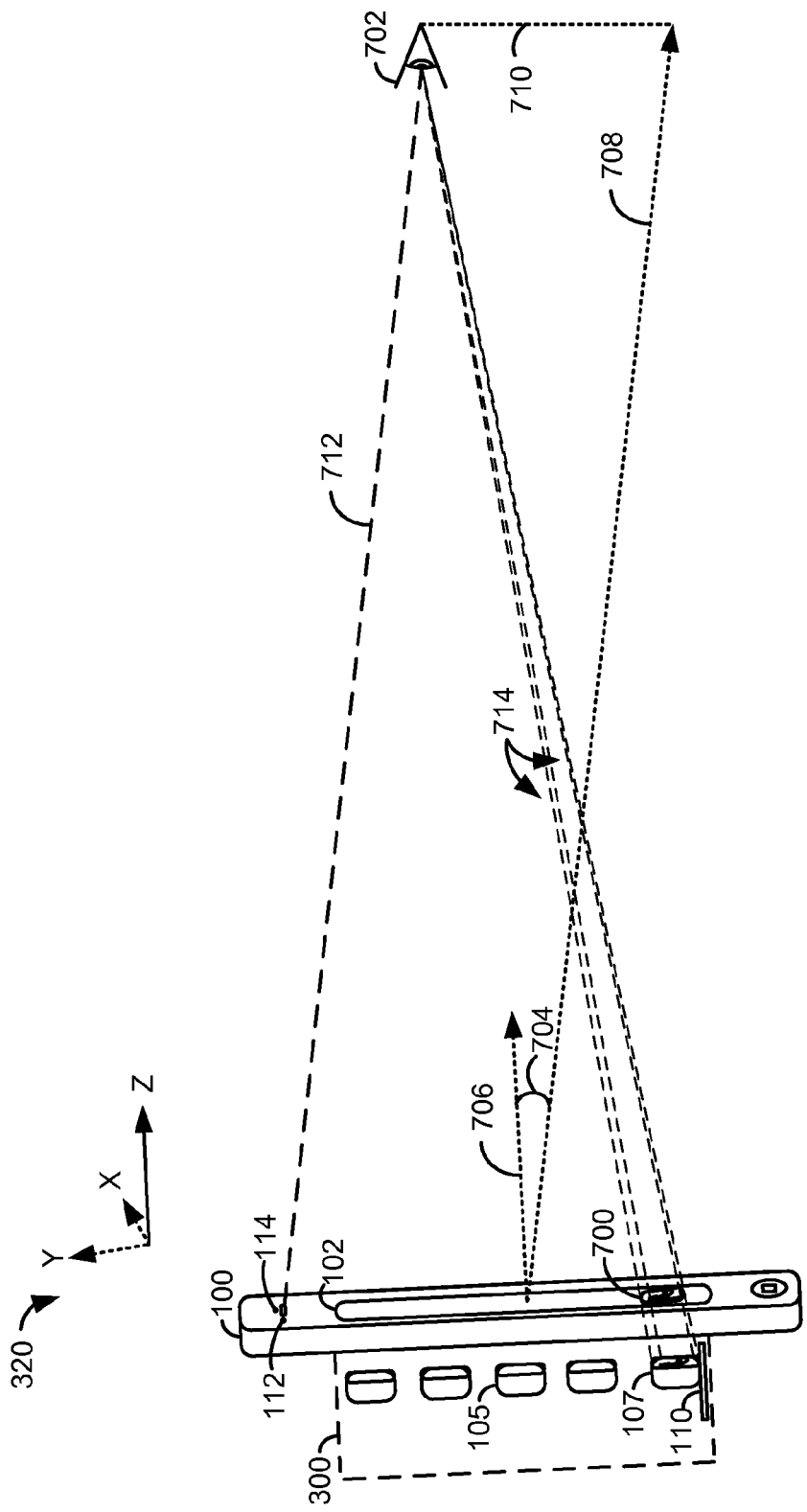
FIG. 7 illustrates the effects of user movement on a personal electronic device presenting a virtual 3D depiction of a graphical user interface object, in accordance with one embodiment.

Referring now to FIG. 7, the effects of user movement on a personal electronic device 100 presenting a virtual 3D depiction 700 of a graphical user interface object 107 is illustrated, in accordance with one embodiment. As in FIG. 3, dashed line 712 indicates the path from the user's eyes to the optical sensor(s) 112 of device 100. As mentioned above, optical sensor(s) 112 may be used to: estimate the length of dashed line 712 (that is, the distance of the user's eyes and/or head to the device); detect (and potentially recognize) the face of the user; measure the current distance between the user's pupils; or to locate light sources in the user's environment. Vector 706 represents a binormal vector that points perpendicularly out from the display 102. Vector 708 represents a vector extending from the display 102 directly to the position of the center of user's eyes 702 along the X-axis. Dashed line 710 is depicted to help illustrate the position of user's eyes 602 in the direction of the X-axis with respect to the display 102. The angle 704 between vector 706 and vector 708 can be used by device 100 to determine the angle at which the user is likely viewing display 102. As illustrated in FIG. 7, the user appears to be slightly to the left of the binormal vector 706, i.e., slightly closer to the "surface" of the page rather than deeper "into" the page.

Compared to FIG. 3, the eyes 702 of the user in FIG. 7 are much farther away from the display 102 of device 100. As such, the ray tracing and projection (as represented by dashed lines 714) of graphical user interface object 107 onto the display 102 places depiction 700 of graphical user interface object 107 at a lower position on the display 102 in FIG. 7 than the depiction 206 of graphical user interface object 107 in FIG. 3. This is consistent with producing the effect of the user looking through a "window" into the virtual 3D operating system environment 300. Monitoring the position of device 100 in addition to the position of the eyes 702 of the user can provide for a compelling and realistic virtual experience. It should be noted, however, that monitoring the device's Frenet frame changes over time alone (i.e., not in conjunction with the position of the user) often provides sufficient information for the device's operating system software to create realistic 3D UI effects. Creating 3D UI effects without knowing the exact position of the user is possible by assuming a typical user's position with respect to the device. For example, it is recognized that, ergonomically, there are a small number of positions that are useful for viewing a personal electronic device's display. Small devices are generally held closer to the user's eyes, and larger devices are generally held farther away from the user's eyes. Additionally, the user's gaze is generally focused centrally on the display surface of the device.

Figure 8:
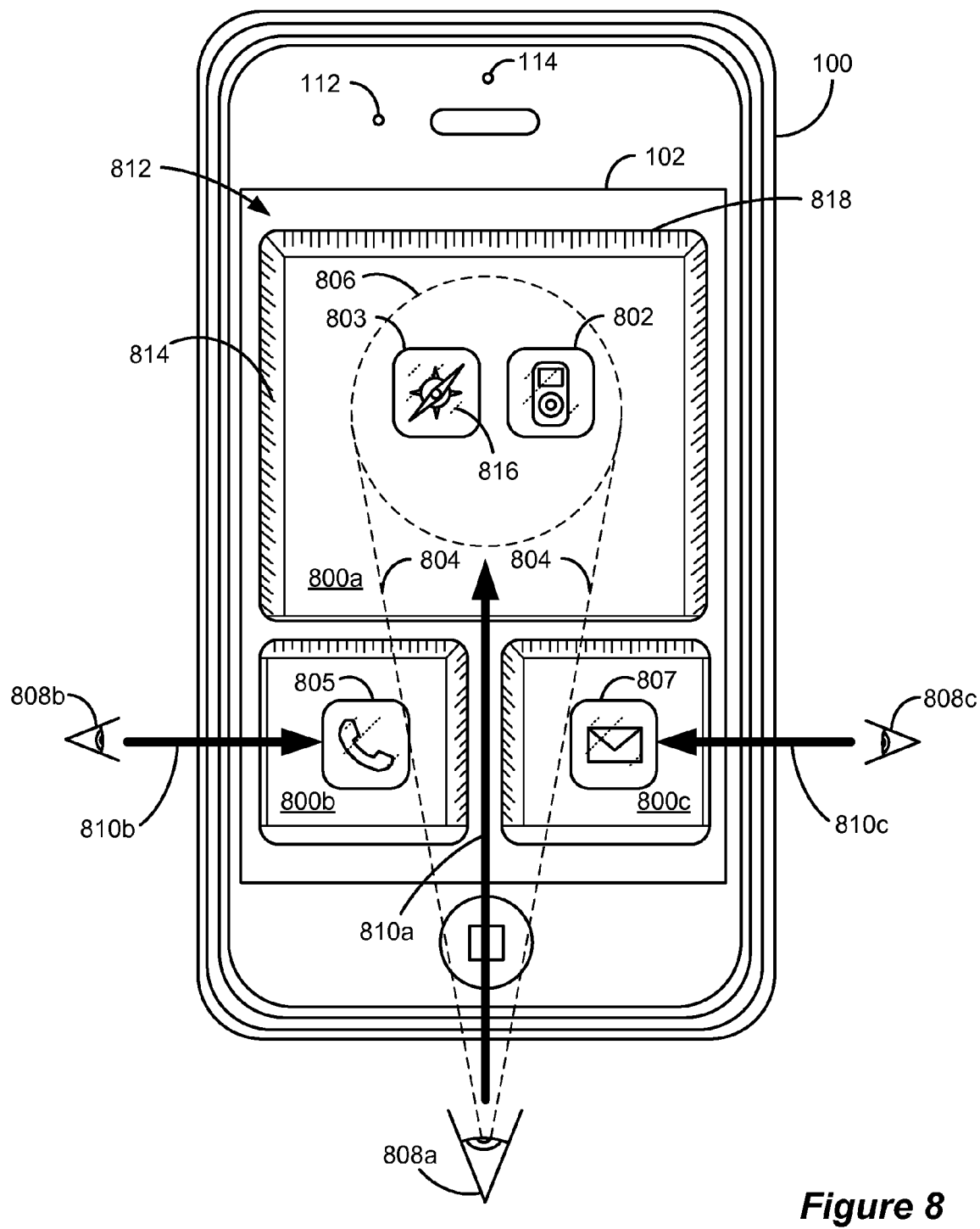
FIG. 8 illustrates a recessed, "bento box" form factor inside the virtual 3D display of a personal electronic device, in accordance with one embodiment.

Referring now to FIG. 8, a recessed, "bento box" form factor inside the virtual 3D environment 812 of a personal electronic device 100 is illustrated, in accordance with one embodiment. As the user moves the device 100 around, the shadows 814 depicted on the display 102 could move as well, thus increasing the 3D effect perceived by the user. Various other 3D effects could also be employed to increase the 3D effect perceived by the user. For example, if the objects 802 inside the virtual 3D environment 812 are rounded, then shines 816 reflecting off the objects could also change correspondingly. If the objects 802 are diffuse, then their shading could change with device 100's movement.

The recessed, "bento box" form factor inside the virtual 3D environment 812 of a personal electronic device 100 may also be constructed with individual interface objects 802 inside each of a group of sub-boxes 800. As shown in FIG. 8, there are three sub-boxes 800*a*/800*b*/800*c*. Each sub-box 800 may have a set of side walls 818 that form the borders of the recessed sub-box 800. As a user reorients device 100 to "look inside" each sub-box 800, a "spotlight" illustrated by dashed lines 804 and dashed circle 806 can highlight the sub-box into which the user's view is currently directed. In some embodiments, a decision as to whether the user is looking into a particular sub-box may be based on, for example, the fact that all walls 818 of that sub-box 800 are forward-facing to the user, and thus visible.

As illustrated in FIG. 8, the user 808*a* is hovering above device 100 and looking down into the display 102 of the device 100, as represented by sightline 810*a* and the fact that no side surfaces of the graphical user interface objects 802/803/805/807 are visible on the currently rendered display 102. For user 808*a*, the spotlight effect 804/806 is applied to the display 102 in the area of sub-box 800*a* and serves to highlight the representations of graphical user interface objects 802 and 803. A spotlight 806 may be considered to be a concentrated virtual light source that is directed at a particular graphical user interface object(s) or area, e.g., sub-box 800*a* in FIG. 8, in the virtual 3D operating system environment. In the graphics arts, displayed object color may be computed by multiplying the light source's color and intensity by the display object's color. A spotlight may be represented as a light source where the light intensity falls off as a function of distance or angular displacement from the center light vector, which may be calculated by subtracting the light source's position from the location where the light is pointed. This function may be, e.g., a function characterized by having an exponential falloff.

Users 808*b* and 808*c* represent alternate positions from which a user could attempt to view the virtual 3D environment 812. From the perspective of user 808*b* looking along sightline 810*b*, all walls 818 of sub-box 800*b* would be forward-facing to the user 808*b*, and thus the spotlight effect 804/806 would be applied to the display 102 in the area of sub-box 800*b* and serve to highlight the representations of graphical user interface object 805. From the perspective of user 808*c* looking along sightline 810*c*, all walls 818 of sub-box 800*c* would be forward-facing to the user 808*c*, and thus the spotlight effect 804/806 would be applied to the display 102 in the area of sub-box 800*c* and serve to highlight the representations of graphical user interface object 807. It is understood that other variants to the recessed, "bento box" form factor fall within the scope of the teachings of this disclosure and could likewise be implemented to take advantage of tracking a 3D frame of reference of the device and/or the position of the user's eyes and/or head to create a more realistic virtual 3D experience for the user.

Figure 9:
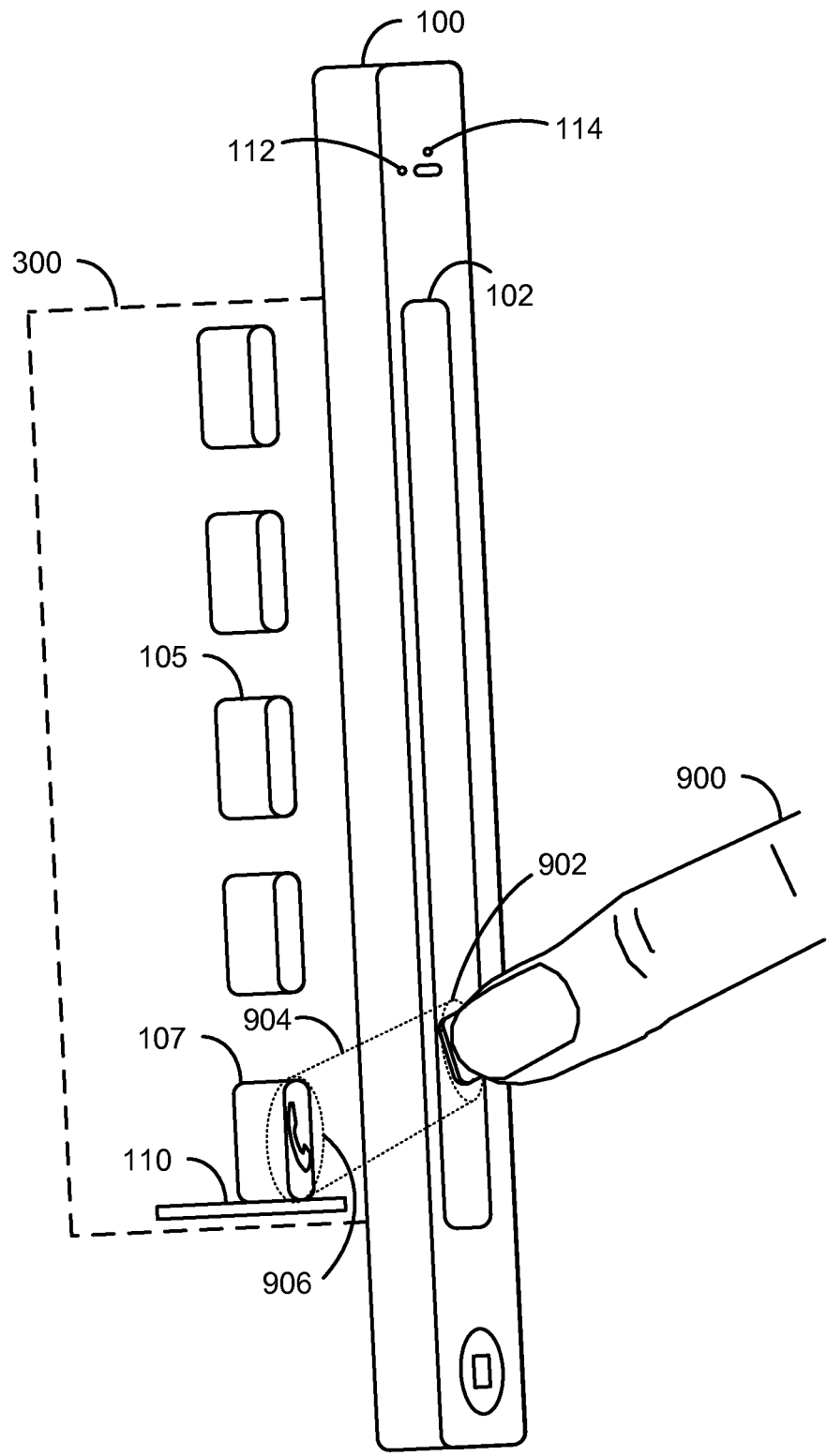
FIG. 9 illustrates a point of contact with the touchscreen of a personal electronic device ray traced into a virtual 3D operating system environment, in accordance with one embodiment.

Referring now to FIG. 9, a point of contact 902 with the touchscreen display 102 of a personal electronic device 101 that is ray traced 904 into a virtual 3D operating system environment 300 is illustrated, in accordance with one embodiment. By ray tracing the location of the touch point of contact 902 on the device's display 102 into the virtual 3D operating system environment 300 (as described above in reference to FIG. 3) and intersecting the region of the touch point in the virtual 3D environment 906 with whatever object or objects it hits, the user can perceive that he or she is interacting with a 3D environment via a 2D touchscreen interface, providing a richer and more realistic user experience. As illustrated in FIG. 9, the location in which the user 900 has touched the touchscreen display 102 corresponds to touch point 906 in virtual 3D environment 300 and intersects with graphical user interface object 107. Thus, a touch by user 900 creating point of contact 902 could result in applying a motion or effect to object 107 in the virtual 3D operating system environment 300 that would cause object 107 in the virtual 3D operating system environment 300 to behave similarly to how it would behave if the device was operating in a traditional "2D" mode. For example, the techniques disclosed herein would make it possible to simulate resizing, depressing, toggling, dragging, pushing, pulling, collision effects, and other physical manifestations of reality within the virtual 3D operating system environment 300 in a more compelling and realistic manner. In the case of simulating a "depress" 3D UI effect, e.g., the depressing of a graphical user interface object such as a button or icon 107, the effect may be implemented in response to the detected position 902 of the user's finger 900. This can be done because, once the touch location 902 of the user's finger 900 is located in the virtual 3D environment 300, e.g., represented by dashed circle 906 in FIG. 9, it may be found that the touch location intersects the plane of some graphical user interface object, e.g., the front plane of icon 107, and any touch movement may be translated into that plane or interpreted in the context of that particular graphical user interface object's potential degrees of freedom of movement. For example, some objects may only be able to be "depressed" inwardly, whereas others may be free to move in any number of directions.

In another embodiment, a shadow or other indicator 902 of the user 900's fingertip may be displayed in the appropriate place in the 2D rendering of the virtual 3D operating system environment 300 depicted on display 102. Information about the position of the user 900's fingertip can be obtained from contact information reported from the touchscreen or from near-field sensing techniques, each of which is known in the art. In this way, the user of device 100 can actually feel like he or she is "reaching into" the virtual 3D environment 300. Using near-field sensing techniques, a finger's position in the "real world" may be translated into the finger's position in the virtual 3D operating system environment by reinterpreting the distance of the finger from the device's display as a distance of the finger from the relevant graphical user interface object in the virtual 3D operating system environment, even when the relevant graphical user interface object is at some "distance" into the virtual 3D world within the display's "window." For example, utilizing the techniques disclosed herein, if a user's finger were sensed to be one centimeter from display 102, the relevant indication of the location of the user's touch point in the virtual 3D operating system environment, e.g., dashed circle 906 in FIG. 9, may cast a shadow or display some other visual indicator "in front of" the relevant graphical user interface object, thus providing an indication to the user that they are not yet interacting with the relevant graphical user interface object, but if the user were to move their finger closer to the display's "window," i.e., touch surface display 102, they may be able to interact with the desired graphical user interface object. The use of a visual indicator of the user's desired touch location, e.g., the "shadow offset," is not only an enhanced 3D UI effect. Rather, because knowledge of the 3D frame of reference of the device allows for better accounting of touchscreen parallax problems, i.e., the misregistration between the touch point and the intended touch location being displayed, the techniques described herein with respect to FIG. 9 may also provide the user of the device with a better representation of what interactions he or she would be experiencing if the graphical user interface objects were "real life" objects.

Figure 10:
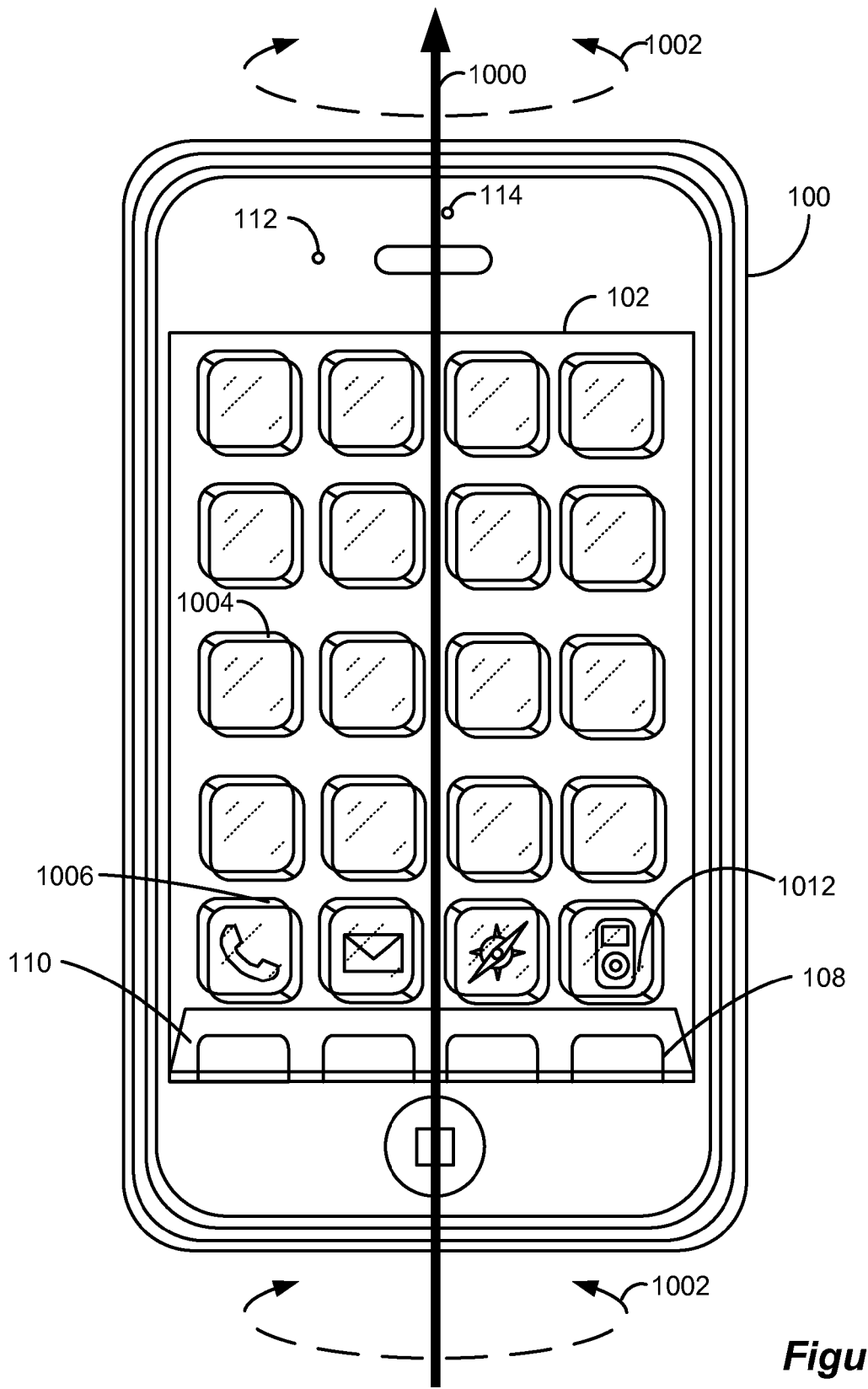
FIG. 10 illustrates an exemplary gesture for activating the display of a personal electronic device to operate in a virtual 3D operating system environment mode, in accordance with one embodiment.

Referring now to FIG. 10, an exemplary gesture 1002 for activating the display 102 of a personal electronic device 100 to operate in a virtual 3D operating system environment mode is illustrated, in accordance with one embodiment. As mentioned above, constantly using the device's GPU for rendering 3D information or ray tracing is computationally expensive and can be a battery drain. In some embodiments, the device will operate in 2D or 2½D mode by default. Thus, a gesture can be used to "unfreeze" the 2D or 2½D display to operate in 3D mode. One potential "activation gesture" is the so-called "princess wave," i.e., the wave-motion rotation of the device about its Y-axis 1000. For example, the virtual 3D operating system environment mode can be turned on when more than three waves of 10-20 degrees 1002 of modulation along one axis 1000 occur within a predetermined threshold amount of time, e.g., one second. Position quiescence, e.g., holding the device relatively still for at least a predetermined threshold amount of time, e.g., two to three seconds, could be one potential cue to the device 100 to freeze back to the 2D or 2½D operating system environment mode and restore the display of objects to their traditional 2D representations. In this way, it is unlikely that the device 100 could be put into 3D mode without explicit control and intent from the user. It is also likely that the device would return to the computationally cheaper 2D or 2½D mode automatically, if left alone for a sufficient amount of time.

In one embodiment, when the appropriate activating gesture 1002 for activating the display 102 of a personal electronic device is detected and the virtual 3D operating system environment mode turns on, each of the graphical user interface objects on the display of the device may "unfreeze" and turns into a 3D depiction of the object, e.g., a depiction that is nearly identical to the 2D depiction of the object, along with shading, shine reflections 1012, and/or textures indicative of 3D object appearance. For example, each of the icons 1006 on a springboard 110, such as is shown on the display 102 of the device 100 in FIG. 10, could transform from 2D representations of icons into 3D "Lucite" cubes 1004/1006, i.e., cubes that appear to be made of a clear plastic or glass-like material and that have pictures at the bottom of them. (LUCITE® is a registered trademark of Lucite International, Inc.) When the icons are unfrozen into the 3D mode, the pictures at the bottoms of the icon cubes 1004/1006 could refract and distort appropriately, providing a visually distinct impression. It is also possible for the cubes to be slightly rounded on their front surfaces. This can be done both to magnify the icons below them and also to catch reflected "light" off their surfaces when the display is reoriented with respect to the user's gaze.

Figure 11:
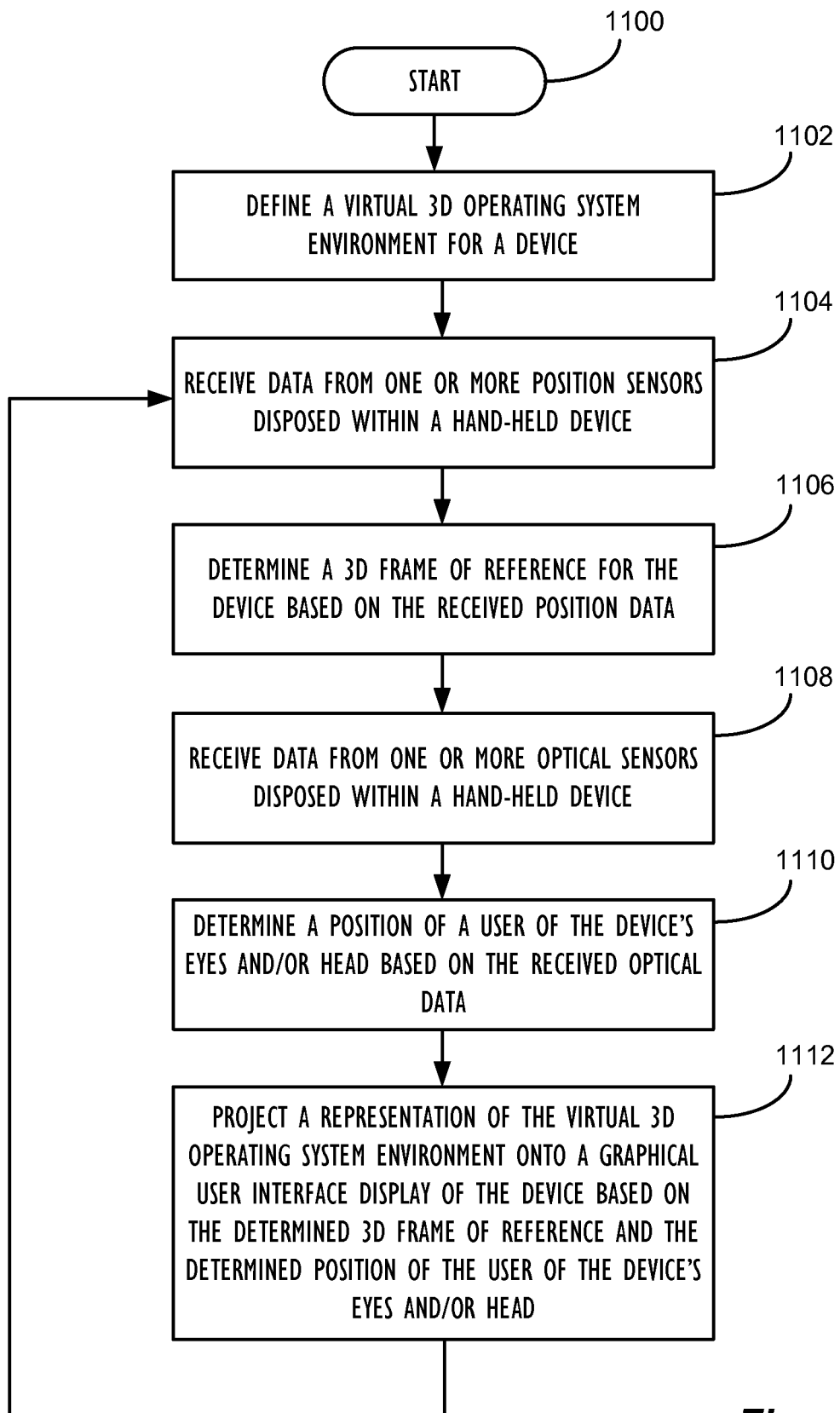
FIG. 11 illustrates, in flowchart form, one embodiment of a process for operating a personal electronic device in a virtual 3D operating system environment mode.

Referring now to FIG. 11, one embodiment of a process for operating a personal electronic device in a virtual 3D operating system environment mode is illustrated in flowchart form. First, the process begins at Step 1100. Next, one or more processors or other programmable control devices within the personal electronic device defines a virtual 3D operating system environment (Step 1102). Next, the processor(s) may receive data from one or more position sensors disposed within a hand-held device (Step 1104). The processor(s) may then determine a 3D frame of reference for the device based on the received position data (Step 1106). Next, the processor(s) may receive data from one or more optical sensors, e.g., an image sensor, a proximity sensor, or a video camera disposed within a hand-held device (Step 1108). The processor(s) may then determine a position of a user of the device's eyes and/or head based on the received optical data (Step 1110). The optical data may comprise one or more of: two-dimensional image data, stereoscopic image data, structured light data, depth map data, and Lidar data. Based on the type of optical data received (and the success or failure of a particular technique in a given situation), the processor(s) may determine the position of the user of the device's eyes and/or head using any number of techniques. For example: stereo imaging methods; structured light techniques (which project a pattern of light on the subject and look at the deformation of the pattern on the subject); "Time of Flight" or other Lidar techniques (which uses laser light to probe the subject and find the distance of a surface by timing the round-trip time of a pulse of light); and/or any other form of 3D range determining techniques may be used to estimate the distance to the user's eyes and/or head. In some situations, two-dimensional image data may be sufficient to satisfactorily locate the eyes and/or head of the user. In other situations, however, due to, e.g., poor lighting conditions or poor image quality, other distance measurement techniques, such as those techniques utilizing infrared light, structured light, laser beams may prove more successful. In another embodiment, Step 1110 may be omitted, and a fixed, assumed position for the user may be used by the processor(s). For example, it is recognized that, ergonomically, there are a small number of positions that are useful for viewing a personal electronic device's display. Small devices are generally held closer to the user's eyes, and larger devices are generally held farther away from the user's eyes. Additionally, the user's gaze is generally focused centrally on the display surface of the device. Finally, the processor(s) may then project, i.e., render, a visual representation of the virtual 3D operating system environment onto a graphical user interface display of the device based on the determined 3D frame of reference and the determined position of the user of the device's eyes and/or head (Step 1112). As discussed in detail above, this process can provide for a distinct and more realistic presentation of a virtual 3D operating system environment onto the display of a user device, e.g., a hand-held, personal electronic device such as a mobile phone.

Figure 12:
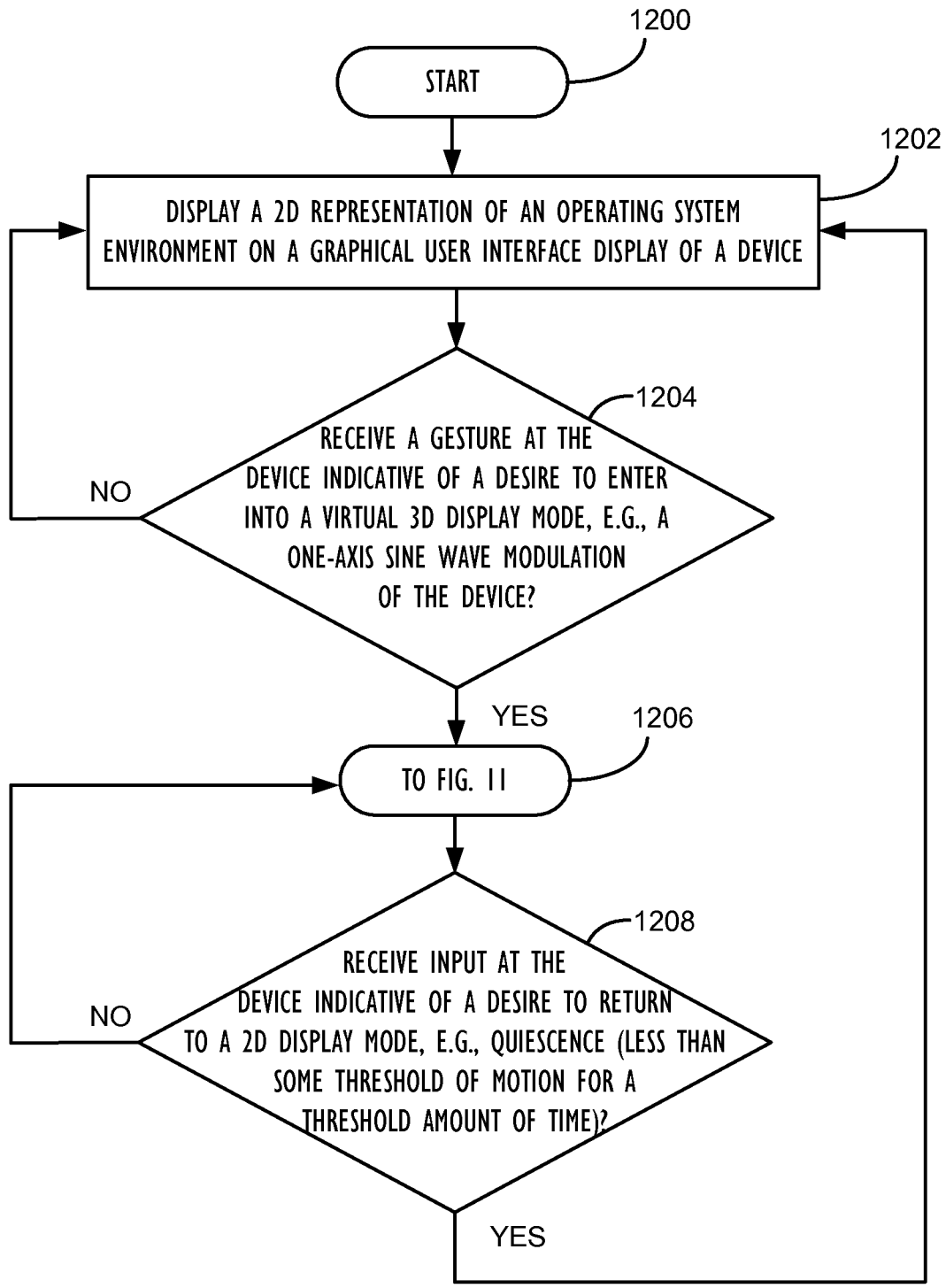
FIG. 12 illustrates, in flowchart form, one embodiment of a process for toggling a personal electronic device between operating in a virtual 3D operating system environment mode and a non-virtual 3D operating system environment mode.

Referring now to FIG. 12, one embodiment of a process for toggling a personal electronic device between operating in a virtual 3D operating system environment mode and a non-virtual 3D operating system environment mode, e.g., a 2D mode, is illustrated in flowchart form. First, the process begins at Step 1200. Next, one or more processors or other programmable control devices within the personal electronic device may display a 2D representation of an operating system environment on a graphical user interface display of a device (Step 1202). Then, the processor(s) detects whether it has received a gesture at the device indicative of a desire of the user to enter into a virtual 3D display mode, e.g., a one-axis sine wave modulation of the device of a sufficient number of degrees and within a sufficiently short amount of time (Step 1204). If it has not received such a gesture, the process returns to Step 1202 and continues to display a 2D representation of the operating system environment. If, instead, the processor(s) has received such a gesture, the process proceeds to Step 1206, which indicates to the processor(s) to perform the process described in FIG. 11, i.e., a process for operating the personal electronic device in a virtual 3D operating system environment mode. While operating in the virtual 3D operating system environment mode, the processor(s) continues to "listen" for gestures at the device indicative of a desire of the user to return to a 2D display mode, e.g., quiescence (less than some threshold of motion for a threshold amount of time (Step 1208). If it has not received such a gesture, the process returns to Step 1206 and continues to display a virtual 3D representation of the operating system environment according to the process described in FIG. 11. If, instead, the processor(s) detects that it has received such a gesture indicative of a desire of the user to return to a 2D display mode, the process returns to Step 1202, i.e., a process for operating the personal electronic device in a 2D display mode.

Figure 13:
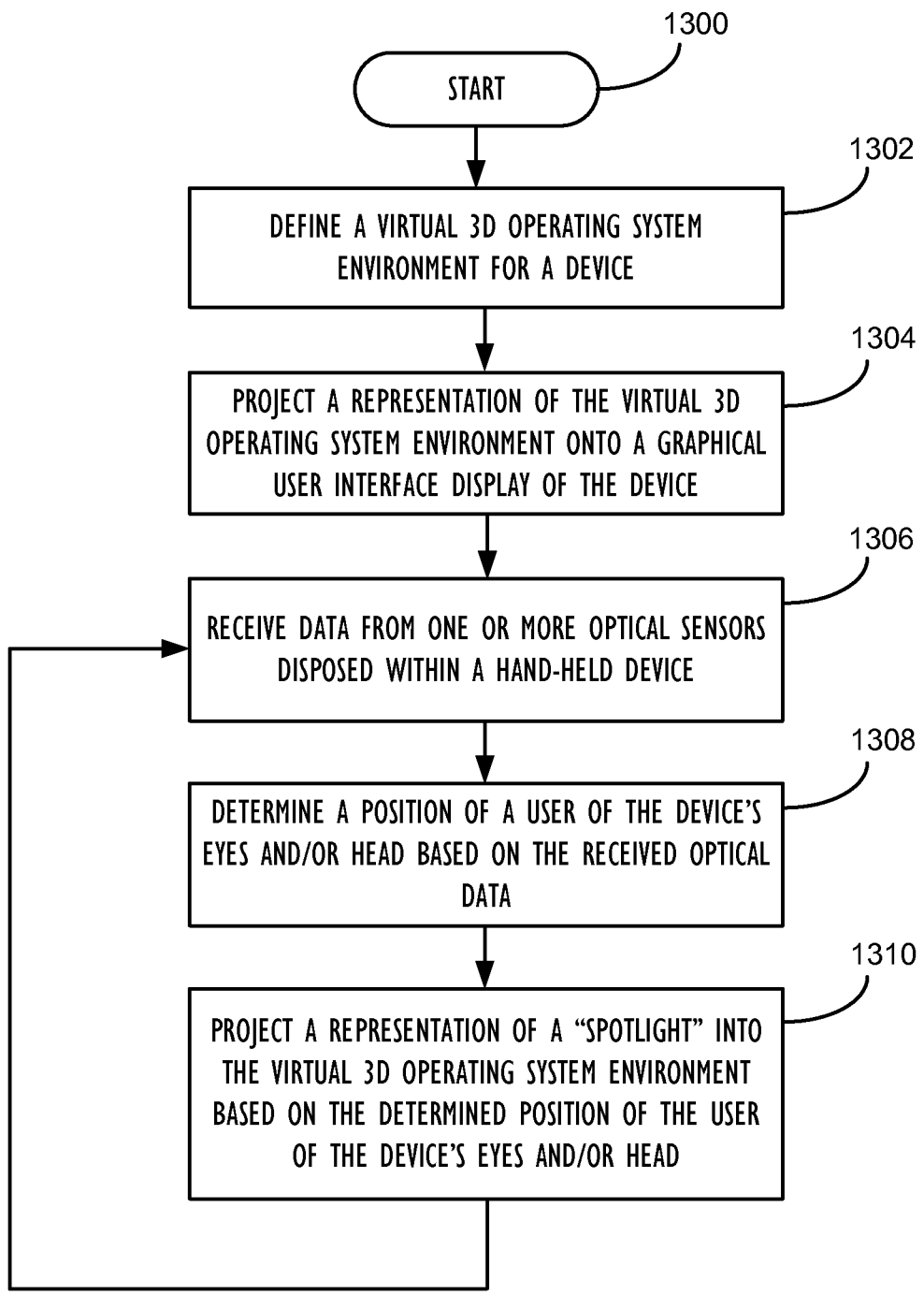
FIG. 13 illustrates, in flowchart form, one embodiment of a process for projecting spotlights indicative of the position of a user's eyes into a virtual 3D operating system environment of a personal electronic device.

Referring now to FIG. 13, one embodiment of a process for projecting spotlights indicative of the position of a user's eyes into a virtual 3D operating system environment of a personal electronic device is illustrated in flowchart form. First, the process begins at Step 1300. Next, one or more processors or other programmable control devices within the personal electronic device defines a virtual 3D operating system environment (Step 1302). Next, the processor(s) may project, i.e., render, a visual representation of the virtual 3D operating system environment onto a graphical user interface display of the device (Step 1304). Next, the processor(s) may receive data from one or more optical sensors, e.g., an image sensor, a proximity sensor, or a video camera, disposed within a hand-held device (Step 1306). The processor(s) may then determine a position of a user of the device's eyes and/or head based on the received optical data (Step 1308). Finally, the processor(s) may then project, i.e., render, a visual representation of "spotlights" into the virtual 3D operating system environment based on the determined position of the user of the device's eyes and/or head (Step 1310), at which the point the process may return to Step 1306, wherein the processor(s) may receive a stream of data from the one or more optical sensors disposed within the hand-held device to allow the device's display to be updated accordingly as the user's eyes continue to move to and focus on different areas of the display.

Figure 14:
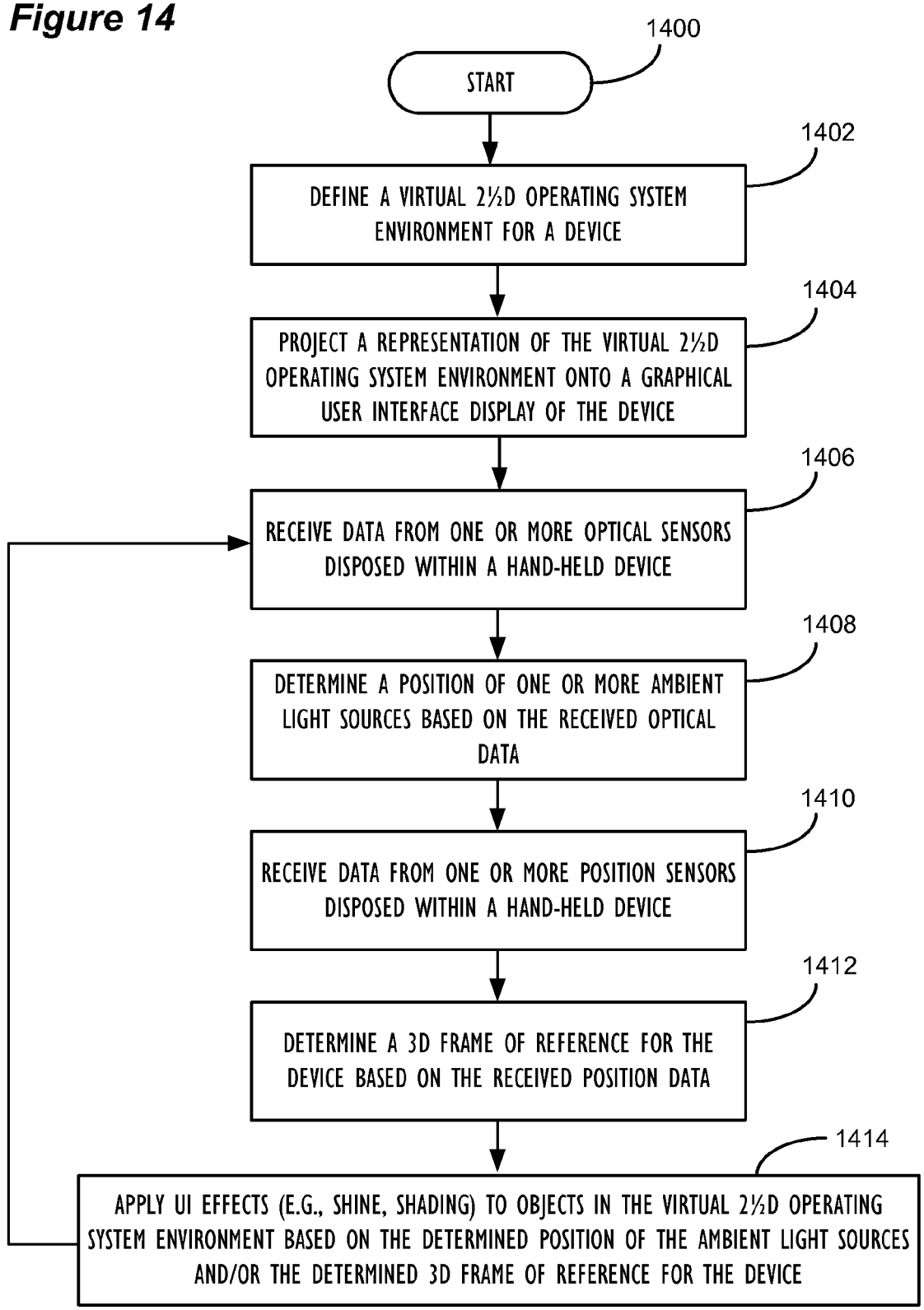
FIG. 14 illustrates, in flowchart form, one embodiment of a process for implementing graphical user interface effects on the display of a personal electronic device based on ambient light sources detected in the environment of the device and/or the relative position of the device.

Referring now to FIG. 14, one embodiment of a process for implementing graphical user interface effects on the display of a personal electronic device based on ambient light sources detected in the environment of the device and/or the relative position of the device is illustrated in flowchart form. First, the process begins at Step 1400. Next, one or more processors or other programmable control devices within the personal electronic device defines a virtual "2½" operating system environment for a device, that is, an enhanced 2D representation of an operating system environment possessing certain additional visual cues on icons, toolbars, windows, etc., such as shading and/or reflections, which additional cues are used to further heighten the "3D appearance" of the 2D icons. In some embodiments, the techniques described with respect to FIG. 14 may also be applied to a virtual 3D operating system environment (Step 1402). Next, the processor(s) may project, i.e., render, a visual representation of the virtual 2½D operating system environment onto a graphical user interface display of the device (Step 1404). Next, the processor(s) may receive data from one or more optical sensors, e.g., an image sensor, a proximity sensor, or a video camera, disposed within a hand-held device (Step 1406). The processor(s) may then determine a position of one or more ambient light sources based on the received optical data (Step 1408). Next, the processor(s) may receive data from one or more position sensors disposed within a hand-held device (Step 1410). The processor(s) may then determine a 3D frame of reference for the device based on the received position data (Step 1412). Finally, the processor(s) may apply UI effects (e.g., shine, shading) to objects in the virtual 2½D operating system environment based on the determined position of the ambient light sources and/or the determined 3D frame of reference for the device (Step 1414). As discussed above in reference to FIG. 2, various graphical layers, such as shadows and shine maps may be dynamically re-positioned without being re-rendered based on the position of the device and/or the location of an ambient light source. Further, adjustments of scale and position can also be made to various graphical user interface objects in order to make the display appear to be even more "3D-like" than it already appears.

Figure 15:
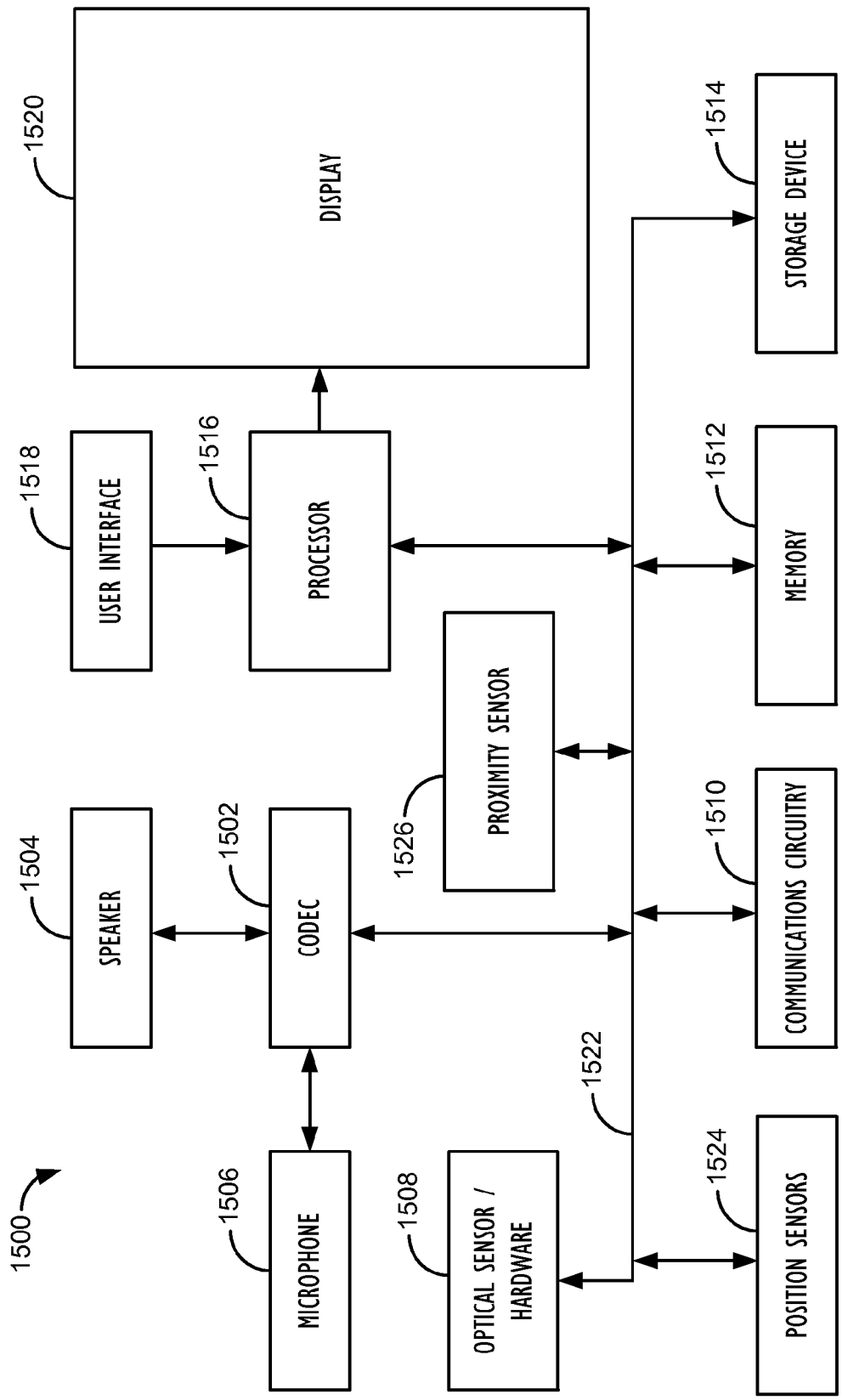
FIG. 15 illustrates a simplified functional block diagram of a personal electronic device, in accordance with one embodiment.

Referring now to FIG. 15, a simplified functional block diagram of a representative personal electronic device 1500 according to an illustrative embodiment, e.g., a mobile phone possessing a camera device such as optical sensor 112, is shown. The personal electronic device 1500 may include a processor(s) 1516, storage device 1514, user interface 1518, display 1520, coder/decoder (CODEC) 1502, bus 1522, memory 1512, communications circuitry 1510, a speaker or transducer 1504, a microphone 1506, position sensors 1524, proximity sensor 1526, and an optical sensor with associated hardware 1508. Processor 1516 may be any suitable programmable control device, including a GPU, and may control the operation of many functions, such as the 3D user interface effects discussed above, as well as other functions performed by personal electronic device 1500. Processor 1516 may drive display 1520 and may receive user inputs from the user interface 1518. In some embodiments, device 1500 may possess one or more processors for performing different processing duties.

Storage device 1514 may store media (e.g., photo and video files), software (e.g., for implementing various functions on device 1500), preference information (e.g., media playback preferences), personal information, and any other suitable data. Storage device 1514 may include one more storage mediums, including for example, a hard-drive, permanent memory such as ROM, semi-permanent memory such as RAM, or cache.

Memory 1512 may include one or more different types of memory which may be used for performing device functions. For example, memory 1512 may include cache, ROM, and/or RAM. Bus 1522 may provide a data transfer path for transferring data to, from, or between at least storage device 1514, memory 1512, and processor 1516. CODEC 1502 may be included to convert digital audio signals into analog signals for driving the speaker 1504 to produce sound including voice, music, and other like audio. The CODEC 1502 may also convert audio inputs from the microphone 1506 into digital audio signals for storage in memory 1512 or storage device 1514. The CODEC 1502 may include a video CODEC for processing digital and/or analog video signals.

User interface 1518 may allow a user to interact with the personal electronic device 1500. For example, the user input device 1518 can take a variety of forms, such as a button, keypad, dial, a click wheel, or a touchscreen. Communications circuitry 1510 may include circuitry for wireless communication (e.g., short-range and/or long range communication). For example, the wireless communication circuitry may be Wi-Fi® enabling circuitry that permits wireless communication according to one of the 802.11 standards. (Wi-Fi is a registered trademark of the Wi-Fi Alliance.) Other wireless network protocols standards could also be used, either as an alternative to the identified protocols or in addition to the identified protocols. Other network standards may include BLUETOOTH®, the Global System for Mobile Communications (GSM®), and code division multiple access (CDMA) based wireless protocols. (BLUETOOTH® is a registered trademark of Bluetooth SIG, Inc., and GSM® is a registered trademark of GSM Association.) Communications circuitry 1510 may also include circuitry that enables device 1500 to be electrically coupled to another device (e.g., a computer or an accessory device) and communicate with that other device.

In one embodiment, the personal electronic device 1500 may be a personal electronic device capable of processing and displaying media such as audio and video. For example, the personal electronic device 1500 may be a media device such as media player, e.g., a mobile phone, an MP3 player, a game player, a remote controller, a portable communication device, a remote ordering interface, an audio tour player, or other suitable personal device. The personal electronic device 1500 may be battery-operated and highly portable so as to allow a user to listen to music, play games or video, record video, stream video, take pictures, communicate with others, interact with a virtual operating system environment, and/or control other devices. In addition, the personal electronic device 1500 may be sized such that it fits relatively easily into a pocket or hand of the user. By being hand-held, the personal computing device 1500 may be relatively small and easily handled and utilized by its user and thus may be taken practically anywhere the user travels.

As discussed previously, the relatively small form factor of certain types of personal electronic devices 1500, e.g., personal media devices, enables a user to easily manipulate the device's position, orientation, and movement. Accordingly, the personal electronic device 1500 may provide for improved techniques of sensing such changes in position, orientation, and movement to enable a user to interface with or control the device 1500 by affecting such changes. For example, position sensors 1524 may comprise compasses, accelerometers, gyrometers, or GPS units. Further, the device 1500 may include a vibration source, under the control of processor 1516, for example, to facilitate sending motion, vibration, and/or movement information to a user related to an operation of the device 1500. The personal electronic device 1500 may include one or more optical sensors and associated hardware 1508 that enables the device 1500 to capture an image or series of images, i.e., video, continuously, periodically, at select times, and/or under select conditions. The personal electronic device 1500 may also include proximity sensors 1526 that enable the device 1500 to characterize and identify light sources in the real world environment surrounding the device 1500 and make determinations of whether, e.g., a user or the finger of a user is in close proximity to the display 1520 of device 1500.

The foregoing description is not intended to limit or restrict the scope or applicability of the inventive concepts conceived of by the Applicants. As one example, although the present disclosure focused on 3D user interface effects for a virtual operating system environment; it will be appreciated that the teachings of the present disclosure can be applied to other contexts, e.g.: digital photography, digital videography, television, video gaming, biometrics, or surveillance. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A graphical user interface method, comprising:
   receiving optical data from one or more optical sensors disposed within a device, wherein the optical data comprises one or more of: two-dimensional image data, stereoscopic image data, structured light data, depth map data, and Lidar data;
   receiving non-optical data from one or more non-optical sensors;
   determining a position of a user of the device's head based, at least in part, on the received optical data and the received non-optical data;
   generating a virtual 3D depiction of at least part of a graphical user interface on a display of the device; and
   applying an appropriate perspective transformation to the virtual 3D depiction of the at least part of the graphical user interface on the display of the device,
   wherein the acts of generating and applying are based, at least in part, on the determined position of the user of the device's head, the received optical data, and the received non-optical data, and
   wherein the at least part of the graphical user interface is represented in a virtual 3D operating system environment.

2. The graphical user interface method of claim 1, wherein at least one of the one or more optical sensors comprises: a front-facing camera, an image sensor, a two-dimensional camera, a stereoscopic camera, an infrared camera, proximity sensor, video camera, or a laser.

3. The graphical user interface method of claim 1, wherein the one or more non-optical sensors do not sense visible light.

4. The graphical user interface method of claim 1, wherein the non-optical data comprises one or more of: data related to a position of the user of the device's head; data transmitted by electromagnetic or electrostatic fields; data transmitted by electromagnetic radiation; and data transmitted by radio frequency waves.

5. The graphical user interface method of claim 1, wherein at least one of the one or more non-optical sensors comprises: eyewear or headgear worn by a user of the device, or positional sensors capable of providing position information related to the user.

6. The graphical user interface method of claim 1, further comprising the act of:
   receiving data from one or more sensors external to the device,
   wherein the act of determining a position of a user of the device's head is further based, at least in part, on the received data from the one or more sensors external to the device, and
   wherein the act of generating is further based, at least in part, on the received data from the one or more sensors external to the device.

7. The graphical user interface method of claim 1, wherein the device comprises at least one of: a computer monitor, a watch, a music player, a television screen, or a dashboard display in a car or other vehicle.

8. A device, comprising:
   a display;
   one or more optical sensors;
   one or more positional sensors;
   a memory; and
   one or more programmable control devices communicatively coupled to the display, the optical sensors, the positional sensors, and the memory,
   wherein the memory includes instructions for causing the one or more programmable control devices to:
   receive optical data from the one or more optical sensors, wherein the optical data comprises one or more of: two-dimensional image data, stereoscopic image data, structured light data, depth map data, and Lidar data;
   receive non-optical data from one or more non-optical sensors;
   determine a position of a user of the device's head based, at least in part, on the received optical data and the received non-optical data;
   generate a virtual 3D depiction of at least part of a graphical user interface on the display; and
   apply an appropriate perspective transformation to the virtual 3D depiction of the at least part of the graphical user interface on the display of the device,
   wherein the instructions to generate and apply are based, at least in part, on the determined position of the user of the device's head, the received optical data, and the received non-optical data, and
   wherein the at least part of the graphical user interface is represented in a virtual 3D operating system environment.

9. The device of claim 8, wherein at least one of the one or more optical sensors comprises: a front-facing camera, an image sensor, a two-dimensional camera, a stereoscopic camera, an infrared camera, proximity sensor, video camera, or a laser.

10. The device of claim 8, wherein the one or more non-optical sensors do not sense visible light.

11. The device of claim 8, wherein the non-optical data comprises one or more of: data related to a position of the user of the device's head; data transmitted by electromagnetic or electrostatic fields; data transmitted by electromagnetic radiation; and data transmitted by radio frequency waves.

12. The device of claim 8, wherein at least one of the one or more non-optical sensors comprises: eyewear or headgear worn by a user of the device, or positional sensors capable of providing position information related to the user.

13. The device of claim 8, wherein the memory further includes instructions for causing the one or more programmable control devices to:
   receive data from one or more sensors external to the device,
   wherein the instructions to determine a position of a user of the device's head further comprise instructions to determine the position of the user of the device's head based, at least in part, on the received data from the one or more sensors external to the device, and wherein the instructions to generate a virtual 3D depiction of at least part of a graphical user interface on the display further comprise instructions to generate the virtual 3D depiction of at least part of the graphical user interface on the display based, at least in part, on the received data from the one or more sensors external to the device.

14. The device of claim 8, wherein the device comprises at least one of: a computer monitor, a watch, a music player, a television screen, or a dashboard display in a car or other vehicle.

15. A non-transitory program storage device comprising instructions stored thereon to cause one or more processors to:
receive optical data from one or more optical sensors in a device, wherein the optical data comprises one or more of: two-dimensional image data, stereoscopic image data, structured light data, depth map data, and Lidar data;
receive non-optical data from one or more non-optical sensors;
determine a position of a user of the device's head based, at least in part, on the received optical data and the received non-optical data; and
generate a virtual 3D depiction of at least part of a graphical user interface on a display of the device; and
apply an appropriate perspective transformation to the virtual 3D depiction of the at least part of the graphical user interface on the display of the device,
wherein the instructions to generate and apply are based, at least in part, on the determined position of the user of the device's head, the received optical data, and the received non-optical data, and
wherein the at least part of the graphical user interface is represented in a virtual 3D operating system environment.

16. The non-transitory program storage device of claim 15, wherein at least one of the one or more optical sensors comprises: a front-facing camera, an image sensor, a two-dimensional camera, a stereoscopic camera, an infrared camera, proximity sensor, video camera, or a laser.

17. The non-transitory program storage device of claim 15, wherein the one or more non-optical sensors do not sense visible light.

18. The non-transitory program storage device of claim 15, wherein the non-optical data comprises one or more of: data related to a position of the user of the device's head; data transmitted by electromagnetic or electrostatic fields; data transmitted by electromagnetic radiation; and data transmitted by radio frequency waves.

19. The non-transitory program storage device of claim 15, wherein at least one of the one or more non-optical sensors comprises: eyewear or headgear worn by a user of the device, or positional sensors capable of providing position information related to the user.

20. The non-transitory program storage device of claim 15, wherein the instructions further comprise instructions for causing the one or more processors to:
receive data from one or more sensors external to the device,
wherein the instructions to determine a position of a user of the device's head further comprise instructions to determine the position of the user of the device's head based, at least in part, on the received data from the one or more sensors external to the device, and
wherein the instructions to generate a virtual 3D depiction of at least part of a graphical user interface on the display further comprise instructions to generate the virtual 3D depiction of at least part of the graphical user interface on the display based, at least in part, on the received data from the one or more sensors external to the device.

* * * * *